US011512862B2

(12) United States Patent
Nagle, Jr. et al.

(10) Patent No.: US 11,512,862 B2
(45) Date of Patent: Nov. 29, 2022

(54) SYSTEM AND METHOD FOR GARAGE VENTILATION CONTROL LOGIC

(71) Applicant: Nagle Energy Solutions, LLC., Menlo Park, CA (US)

(72) Inventors: Francis J Nagle, Jr., Menlo Park, CA (US); Ronald A Lea, Vancouver (CA); Robin D Shaffer, Emerald Hills, CA (US)

(73) Assignee: NAGLE ENERGY SOLUTIONS, LLC, San Mateo, CA (US)

( * ) Notice: Subject to any disclaimer, the term of this patent is extended or adjusted under 35 U.S.C. 154(b) by 72 days.

(21) Appl. No.: 16/040,935

(22) Filed: Jul. 20, 2018

(65) Prior Publication Data
US 2020/0025400 A1 Jan. 23, 2020

(51) Int. Cl.
| F24F 11/46 | (2018.01) |
| F24F 7/007 | (2006.01) |
| G05B 15/02 | (2006.01) |
| F24F 11/77 | (2018.01) |
| F24F 110/65 | (2018.01) |
| F24F 110/72 | (2018.01) |

(52) U.S. Cl.
CPC .............. *F24F 11/46* (2018.01); *F24F 7/007* (2013.01); *F24F 11/77* (2018.01); *G05B 15/02* (2013.01); *F24F 2110/65* (2018.01); *F24F 2110/72* (2018.01)

(58) Field of Classification Search
CPC .. F24F 11/46; F24F 11/77; F24F 7/007; F24F 2110/72; F24F 2110/65; G05B 15/02
See application file for complete search history.

(56) References Cited

U.S. PATENT DOCUMENTS

| 6,040,636 A * | 3/2000 | DiCroce ................ B60K 28/10 307/10.1 |
| 6,757,592 B1 * | 6/2004 | Henderson ......... G05D 23/1913 361/695 |
| 2013/0085616 A1 * | 4/2013 | Wenzel ..................... G05F 1/66 700/278 |
| 2021/0172632 A1 * | 6/2021 | Saunders ................. F24F 11/30 |

FOREIGN PATENT DOCUMENTS

| AU | 2013101580 A4 * | 1/2014 |
| CN | 106527285 A * | 3/2017 |

OTHER PUBLICATIONS

Stein, Jeff. Garage Exhaust Measure. 2013 California Building Energy Efficiency Standards. Mar. 22, 2011. pp. 1-48. Retrieved from the Internet <http://h-m-g.com/T24/ESReports/2013_CASE_GarageExhaust_031711_draft.pdf> (Year: 2011).*

(Continued)

*Primary Examiner* — Rocio Del Mar Perez-Velez
*Assistant Examiner* — Vi N Tran
(74) *Attorney, Agent, or Firm* — Berenato & White, LLC

(57) ABSTRACT

A software implementation and method for garage ventilation control logic to intelligently modulate the rate of speed of a plurality of garage fan motors in an enclosed commercial parking garage structure. The savings are primarily driven by the known cubic relationship between fan power draw and fan speed, whereby fans operating at lower speeds will draw much less power than operating at higher speeds, taking advantage of the highly non-linear relationship between the two.

56 Claims, 21 Drawing Sheets

(56) References Cited

OTHER PUBLICATIONS

Ashrae. Ashrae Handbook of Heating, Ventilating and Air Conditioner Applications. Ashrae Publication, Jul. 15, 2015. (Year: 2015).*

Navter. "Parking Garage Monitor." 2 pages, Sep. 5, 2017. Retrieved from the Internet <http://www.navter.com/wp-content/uploads/2017/09/PARKING_AREA_GARAGE_MONITOR.pdf> (Year: 2017).*

AirTest. CN7232 Advanced Garage Ventilation Controller, 8 pages, May 16, 2018. Retrieved from the Internet <https://www.airtest.com/support/datasheet/CN7216-32.pdf> (Year: 2018).*

Graham et al. "Contribution of Vehicle Emissions from an Attached Garage to Residential Indoor Air Pollution Levels" (online) Feb. 22, 2012. Taylor & Francis Group. Air & Waste Manage. Assoc. 54:563-584 (Year: 2012).*

Machine Translation for CN 106527285 A, obtained May 2021 (Year: 2021).*

Il'ina T N and Isaeva V V 2018 Economic Feasibility of Ventilation Cleaning Emissions in Underground Parkings J. Phys.: Conf. Ser. 1066 012007 (Year: 2018).*

Eshack, Adil, et al. "Monitoring and simulation of mechanically ventilated underground car parks." Journal of Thermal Engineering 1.5 (2015): 295-302. (Year: 2015).*

\* cited by examiner

| Law No. | Dependent Variables | | | Independent Variables |
|---|---|---|---|---|
| 1a | $Q_1$ | $=$ | $Q_2$ × | $(D_1/D_2)^3 (N_1/N_2)$ |
| 1b | $P_1$ | $=$ | $P_2$ × | $(D_1/D_2)^2 (N_1/N_2)^2 \rho_1/\rho_2$ |
| 1c | $W_1$ | $=$ | $W_2$ × | $(D_1/D_2)^5 (N_1/N_2)^3 \rho_1/\rho_2$ |
| 2a | $Q_1$ | $=$ | $Q_2$ × | $(D_1/D_2)^2 (P_1/P_2)^{1/2} (\rho_2/\rho_1)^{1/2}$ |
| 2b | $N_1$ | $=$ | $N_2$ × | $(D_2/D_1) (P_1/P_2)^{1/2} (\rho_2/\rho_1)^{1/2}$ |
| 2c | $W_1$ | $=$ | $W_2$ × | $(D_1/D_2)^2 (P_1/P_2)^{3/2} (\rho_2/\rho_1)^{1/2}$ |
| 3a | $N_1$ | $=$ | $N_2$ × | $(D_2/D_1)^3 (Q_1/Q_2)$ |
| 3b | $P_1$ | $=$ | $P_2$ × | $(D_2/D_1)^4 (Q_1/Q_2)^2 \rho_1/\rho_2$ |
| 3c | $W_1$ | $=$ | $W_2$ × | $(D_2/D_1)^4 (Q_1/Q_2)^3 \rho_1/\rho_2$ |

*Notes*:
1. Subscript 1 denotes fan under consideration. Subscript 2 denotes tested fan.
2. For all fans laws $(\eta_t)_1 = (\eta_t)_2$ and (Point of rating)$_1$ = (Point of rating)$_2$.
3. *P* equals either $P_{tf}$ or $P_{sf}$.

FIG. 1

SYSTEM AND METHOD FOR GARAGE VENTILATION CONTROL LOGIC

CROSS REFERENCE TO RELATED APPLICATIONS

This Non-Provisional Patent Application claims priority to previously filed Provisional Patent Application U.S. 65/535,220 filed on Jul. 20, 2018.

STATEMENT REGARDING FEDERALLY SPONSORED RESEARCH AND DEVELOPMENT

None.

FIELD OF THE INVENTION

The present invention relates to a software implementation and method for garage ventilation control logic to intelligently modulate the rate of speed of a plurality of garage fan motors in an enclosed garage structure.

BACKGROUND

Most enclosed parking garage structures today are subject to ventilation standards established by the International Mechanical Code (IMC). In North America, such structures are further subject to the rules established by the American Society of Heating, Refrigeration and Air Conditioning (ASHRAE). Both governing bodies stipulate garage ventilation systems must run continuously during building occupied hours. The only instance in which continuous ventilation of the garage is not required is when the property owner deploys a Demand-Control Ventilation System which monitors such gases as Carbon monoxide (CO) and/or Nitrogen dioxide ($NO_2$).

With California serving as a model for the remaining 49 states, research shows roughly 35% of commercial garages that possess a mechanical ventilation system deploy a CO-sensor-based demand-control ventilation (DCV) system. $NO_2$ detection and control is required in enclosed garages wherever a certain, minimum percentage of diesel-based vehicle traffic is anticipated.

Of the installed base of garage ventilation control systems in California, for example, the majority of these systems fall in the category of binary on/off systems, which activates the garage fan motors to ventilate the garage only when increased CO levels require it. The typical threshold point for on/off control is when CO levels equal or exceed 25 parts per million (ppm) before the fan motor units are activated to provide ventilation.

Deployment of a binary on/off CO systems creates as many issues as it does solutions. For Example, the California Utilities Statewide Codes and Standards Team noted a common problem that, due to their simplistic design, a significant percentage of binary on/off CO sensor systems installed throughout the years had "failed off," meaning a sensor had become inoperable but without any indication of sensor failure and with possible consequences to system energy consumption and garage air quality. In fact, according to field inspection studies, the failure rate of such systems was shown to be as high as 90%.

The unintended consequence is to create health and safety risks for commercial garage workers and visitors alike, as well as for those who live and/or work above a below-grade parking facility, with gas concentrations rising to unhealthy levels in most commercial garages without anyone being aware of the issue.

Additionally, it is critical to consider the impact of an "on/off" CO sensor ventilation control strategy on peak electric power draw, which influences the cost of peak demand charges from regional electric utilities. The time most garage-fan motors are likely turn on is during peak demand periods (roughly from noon to 6 p.m., depending on the utility and the region). This is also when most people leave work, and cold starts are when cars emit the highest concentration(s) of hazardous gases, before an automobile's catalytic converter has warmed up sufficiently to be effective.

The potential to incur peak energy (kW) demand charges occurs when a significant number of cars start simultaneously, like at quitting time for example, causing emissions to exceed hazardous gas "trip point" levels and thus ramp the garage fan motors to their full speeds. Should the garage-fan motors be on at the time the local utility is monitoring peak demand consumption, the property owner may be hit with high peak demand charges not only for that day, but also the entire month in many utility districts.

Due to the drawbacks presented by the incumbent "on/off" CO sensor systems, a small number of states, including California, have adopted stricter (than the IMC/ASHRAE standards) garage ventilation requirements. Specifically, they require continuous ventilation in the garage even when a CO and/or $NO_2$ DCV system is in place.

An increasing number of other states have or are moving toward revising their respective Energy Codes to reflect stricter standards, including the requirement for continuous ventilation. It is anticipated that, over time, each of the 50 states and Canada will require continuous ventilation in enclosed, commercial garages even when CO (and/or $NO_2$) sensor-based DCV system is deployed. In response, the marketplace has taken incremental steps toward introducing other methods of enclosed garage ventilation to meet the new standards, but it has been done from the standpoint of adherence versus a focus on innovation.

SUMMARY OF THE INVENTION

The present invention is directed to methods of controlling a plurality of ventilation fan motors continuously and vary the motor speeds based on the level of gas concentrations in the enclosed space.

Fully enclosed parking garages are usually located underground where carbon monoxide emissions and other potentially hazardous gases from vehicles present a danger to occupants. Therefore, fully enclosed garages require mechanical ventilation (i.e., the intentional introduction of outdoor air), which can be costly to operate because of the fan energy required. It is known in the field that the use of contaminant-based ventilation controls can achieve significant energy savings compared to traditional methods such as constant ventilation or hourly ventilation schedules during open hours.

Key to the preferred embodiment approach is understanding fan behavior in the context of variable speed control and contaminant dispersion. The basic principle of fan operation is that an electric motor is used to produce airflows with high volume and relatively low pressure. Different fan types produce different airflow velocity patterns. For example, velocity changes occur in the tangential and radial velocity components in centrifugal fans and in the axial and tangential velocity components in axial fans. The preferred embodiment control algorithm provides a novel approach to contaminant-based ventilation controls and takes advantage of the non-linear nature of fan affinity laws (i.e., "fan laws") that demonstrate that power is proportional to the cube of shaft speed.

The preferred embodiment approach to controlling the speed of ventilation fan motors in order to optimize energy savings assumes that, when operating, the fans operate at a constant baseline speed (e.g., 25% of full capacity or whatever speed will achieve minimum required flow rates, typically 0.187 cm/ft² or higher), increasing fan speed only in response to particular gas concentrations measured in the space.

For example, the preferred embodiment's response is linear, such as increasing fan speed from 25% to 100% between 10 ppm and 35 ppm for CO gases and operating continuously at 100% fan speed at 35 ppm and above. One of the benefits of this approach is that the fan will operate more often at a lower speed (and thus lower flow rate) than other common approaches. As an example of this benefit, because of the cubic relationship between power and flow, a fan operating at 25% of full capacity would use only 12.5% of the power of a fan operating at 50% capacity and only 1.5% of the power of a fan operating at 100% capacity.

In practice, this optimization strategy can be implemented as a programming logic wherein the programming logic is designed to respond to the detection and measurement of Carbon Monoxide (CO) and Nitrogen Oxide ($NO_2$) produced by vehicle fumes in an enclosed parking structure. As gas concentrations rise to and above the predetermined set points (measured in parts per million (ppm)), the programming logic issues a command to increase the motor speed and boost the supply of fresh air in the enclosed space. The rate of speed at which the motor is programmed to run is in direct proportion to the gas concentration levels in the enclosed space.

Specifically, the programming language can be implemented using Building Automation and Control (BAC) hardware and software network protocol (also known as BACNet) that are compliant and leverage the ASHRAE, ANSI, and ISO 16484-5 standard protocol or similar protocols available in the market. The preferred embodiment's control strategy can be written as a custom code on top of existing BACNet modules. For example, it is well known in the building automation industry that many control systems use the Niagara AX/4 framework. The Niagara Framework is a universal software infrastructure that allows organizations to easily build custom, web-enabled applications for accessing, automating, and controlling "smart" devices in real-time over the internet. BACNet is a Data Communications Protocol for Building Automation and Control Networks. Finally, the Java Application Control Engine (JACE) is used as a mechanism/device that provides connectivity to systems within a building via the Niagara framework.

BRIEF DESCRIPTION OF DRAWINGS

These and other features, aspects, and advantages of the present invention will become better understood with regard to the following descriptions, appended claims and accompanying drawings where:

FIG. 1 is a table of fan affinity laws (i.e. "fan laws") that demonstrate that power is proportional to the cube of shaft speed.

REFERENCE NUMERAL INDEX

Figure 2:
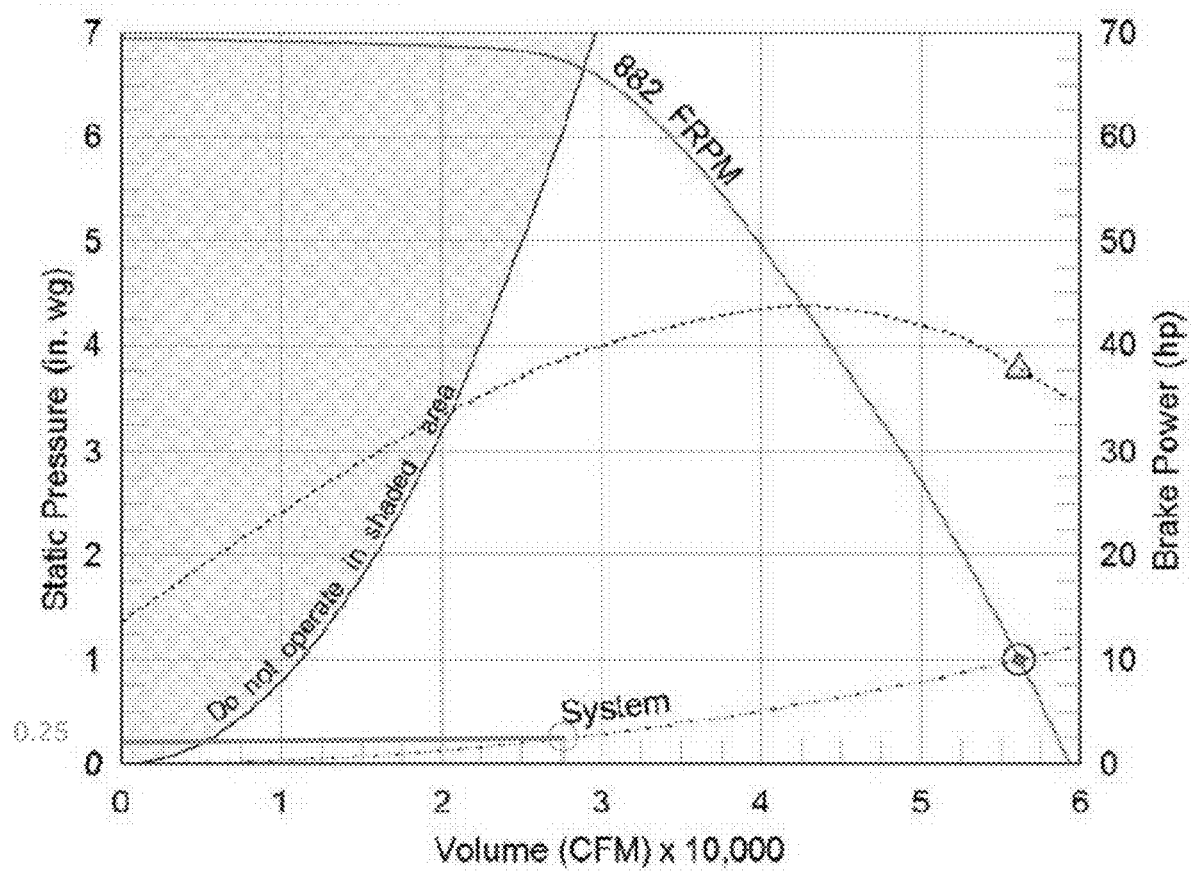
FIG. 2 is a graph depicting the fan curve family of BHP, static pressure, FRPM for a fan that is used in the preferred embodiment.
Figure 3A:
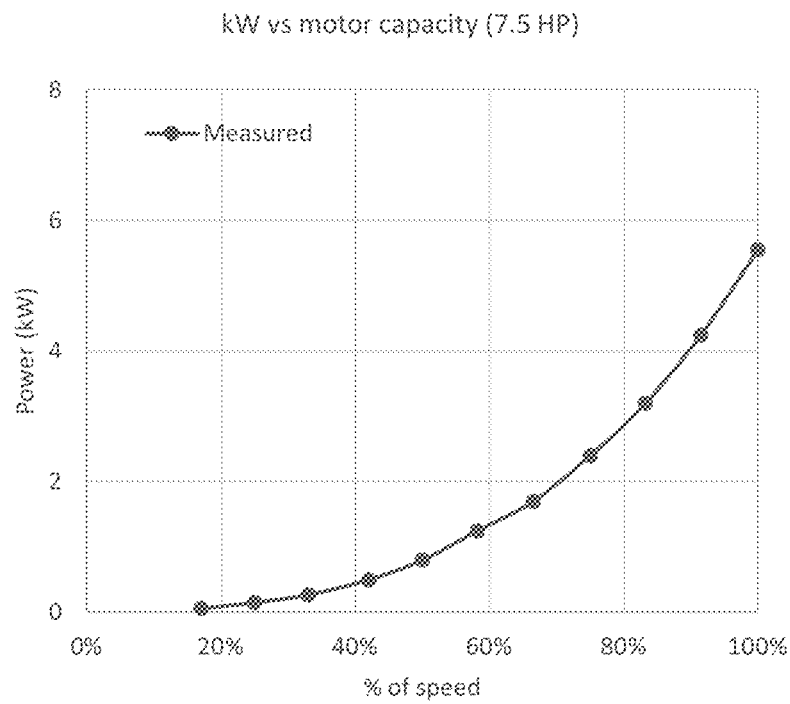
FIGS. 3A and 3B show diagrams of the relationship between power usage and motor capacity for 7.5 HP motor and 40 HP motor, respectively.
Figure 3B:
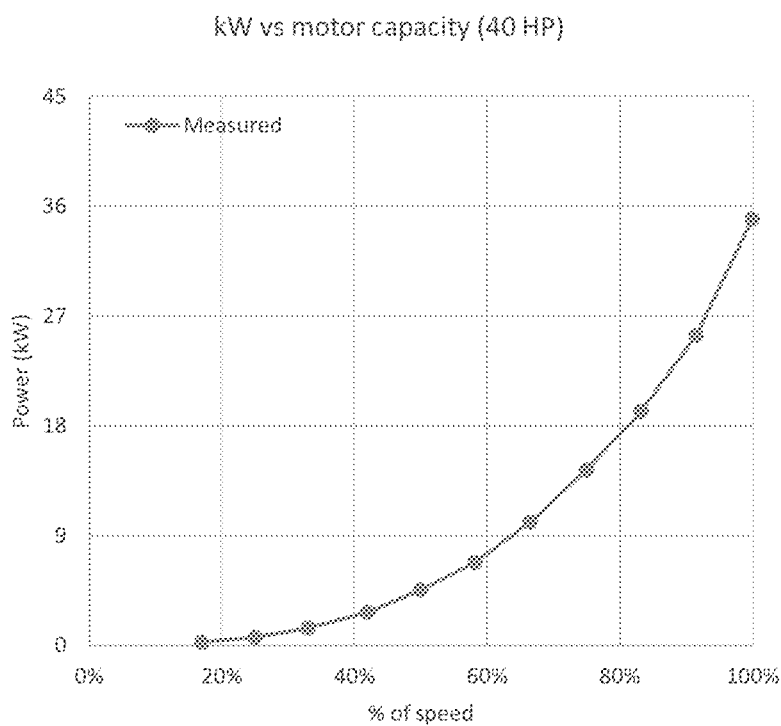

100—Garage Ventilation Control Logic
200—Field Network
201—Gas Sensors
202—Variable Controls
300—Schedule Logic
301—Mode Determination
302—Occupied Schedule
303—Unoccupied Schedule
304—Occupied Control
305—Unoccupied Control
400—Gas Sensor Monitoring Module
410—Gas Sensor Monitoring Module (CO)
420—Gas Sensor Monitoring Module ($NO_2$)
500—Gas Control Modules
510—High Average Function Module (CO)
520—Gas Control Module ($NO_2$)
800—Fan Control Modules
801—Fan Control Module (CO)
802—Fan Control Module (NO2)
900—Monitoring Module
901—Reset Module
902—Energy Monitoring Module
903—Lifetime Data Module
1000—Energy Savings Calculator Module
1001—Baseline Energy Calculator Module
1002—Energy Savings Comparison Module
1003—Lifetime Data Module
1100—Alarm Control Module
1200—Report Services -continued

REFERENCE NUMERAL INDEX

1300—Email Services
1400—Alarm Services
1500—GUI
1600—Web Services

DETAILED DESCRIPTION OF THE PREFERRED EMBODIMENT

Fully enclosed parking garages are usually located underground where carbon monoxide emissions from cars present a serious danger to occupants. Therefore, fully enclosed garages require mechanical ventilation (i.e., the intentional introduction of outdoor air), which can be costly to operate because of the fan energy required. Previous research and prior art have shown that the use of contaminant-based ventilation controls can achieve significant energy savings compared to traditional methods such as constant ventilation or hourly ventilation schedules during open hours.

To fully illustrate the real-world benefits of the preferred embodiment's energy savings, the preferred embodiment control strategy is compared to three common garage ventilation control strategies: (i) Standard Variable Flow (SVF), (ii) On-Off, and (ii) Always On. It should be noted that the term fan should be construed as both singular fan and plural fans, because the method can be applied equally to a single fan, or a plurality of fans present in the area.

The preferred embodiment is defined as a strategy in which the fan is operated at a base speed (approximately 25% of maximum speed of the fan motor speed or at a minimum ventilation rate typically prescribed by HVAC building code standards) until a particular gas concentration reaches a certain minimum value. When the gas readings reach the minimum value (for example, 10 ppm for Carbon monoxide (CO) gases), then the fan motor speed is increased proportionally in a linear fashion for every 1 ppm increase of the detected gas concentration until it reaches a maximum value (again, for example, 35 ppm for CO), at which the fan is operated at maximum capacity.

Standard Variable Flow is defined as a strategy in which the fan is operated at 50% maximum speed until a particular gas concentration reaches a minimum threshold value, and then is increased to 100% of maximum speed for all gas concentrations above said threshold value.

On-Off strategy is defined as fan control during operational hours in which the fans operating at 100% maximum speed when a particular gas concentration reaches a minimum threshold value, and 0% (completely off) when the particular gas concentration reaches below the minimum threshold value.

Always On is defined as fan control during operational hours in which the fans operate at 100% of maximum speed regardless of the gas concentration values.

Therefore, in all three other control strategies other than the preferred embodiment, the fan operates at full capacity as soon as one of the gas sensors detects a gas concentration above the predefined threshold value.

The strategy is modeled using a number of assumptions for (1) the timing and quantity of occupancy patterns of vehicles entering and exiting the garage, (2) per-vehicle CO emission rates of vehicles entering and exiting the garage, and (3) the types of fans used (i.e., including both real fan makes and models as well as generic curves based on the fan affinity laws described in FIG. 1). The CONTAM model results are used to demonstrate expected fan operational behavior and resulting pollutant concentrations. Calculations for energy consumption, peak power draw, and energy savings compared to baseline conditions are performed using the modeled behavior.

The comparison between the strategies also uses assumptions for vehicle occupancy and traffic patterns from two actual parking garages (i.e., named Garage 1 and Garage 2). For both, occupancy pattern data from the week with the highest recorded occupancy was selected for the implementation in CONTAM models. In addition, two assumptions for per-vehicle CO emission rates include: (1) majority "cold start" conditions and (2) majority "warm start" conditions. The "cold start" conditions assume the majority of vehicles have been sitting for a long period of time prior to engine starting, and thus have high CO emission rates. Conversely, the "warm start" conditions assume the majority of vehicles are started after sitting for less than 12 hours, and thus their emission rate is lower. Therefore, the following four scenarios are modeled with each control strategy:

a) Scenario 1: Garage 1 occupancy with majority warm start conditions;
b) Scenario 2: Garage 2 occupancy with majority warm start conditions;
c) Scenario 3: Garage 1 occupancy with majority cold start conditions;
d) Scenario 4: Garage 2 occupancy with majority cold start conditions.

With that said, the preferred embodiment's basic mechanics have been summarily discussed in the previous section above. However, in order to better understand the principles behind the optimizations, certain assumptions and scientific principles have to be laid as a foundation of the discussions below.

Key to the preferred embodiment of this invention is understanding fan behavior. The basic principle of fan operation is that an electric motor is used to produce airflows with high volume and relatively low pressure. Different fan types produce different airflow velocity patterns. For example, velocity changes occur in the tangential and radial velocity components in centrifugal fans and in the axial and tangential velocity components in axial fans. In the preferred embodiment, the control algorithm provides a novel approach to contaminant-based ventilation controls and takes advantage of the non-linear nature of fan affinity laws (i.e., "fan laws") that demonstrate that power is proportional to the cube of shaft speed as seen in FIG. 1.

As seen in FIG. 1, Fan Law 1 shows the effect of changing size, speed, or density on volume airflow rate, pressure, and power level. Fan Law 2 shows the effect of changing size, pressure, or density on volume airflow rate, speed, and power. Fan Law 3 shows the effect of changing size, volume airflow rate, or density on speed, pressure, and power.

The fan laws apply only to a series of aerodynamically similar fans at the same point of rating on the performance curve. They can be used to predict the performance of any fan when test data are available for any fan of the same series. Fan laws may also be used with a particular fan to determine the effect of speed change. However, caution should be exercised in these cases, because the laws apply only when all flow conditions are similar. Changing the speed of a given fan changes parameters that may invalidate the fan laws.

Unless otherwise identified, fan performance data are based on dry air at standard conditions: 14.696 psi and 70° F. (0.075 $lb/ft^3$). In actual applications, the fan may be required to handle air or gas at some other density. The change in density may be caused by temperature, composition of the gas, or altitude. As indicated by the fan laws, fan performance is affected by gas density. With constant size and speed, power and pressure vary in accordance with the ratio of gas density to standard air density.

The optimization strategy of the preferred embodiment relies on the use of real fan speed and power draw data collected in a real parking garage. In order to fully illustrate the benefits of the preferred embodiment, we basically need to compare the power draw of fans at 25% (baseline for the preferred embodiment), 50% (baseline for SVF strategy), and 100% (baseline for on-off and always on strategies) of motor speed. So, in different percent of motor speed or air flow rates, the power is estimated using the combined measured data and fan affinity laws as follows:

$$W_{28\%} = W_{25\%} \left( \frac{Q_{28\%}}{Q_{25\%}} \right)^3$$

The power estimation procedure can be accomplished through the fan and system resistance curve provided by manufacturer and designer. FIG. 2 shows fan curves reported by the manufacturer for an actual existing fan that is currently a standard model in the field. In this instance, the fan used to gather the data is Greenheck Catalog: 49-USF-400 AF. However, it should be noted that other fans common in the field can be substituted in and will perform similarly using the same concept and strategy. The fan curve shown in FIG. 2 shows the relationship between fan static pressure, airflow, and brake horsepower for a given nominal fan speed.

Figure 4:
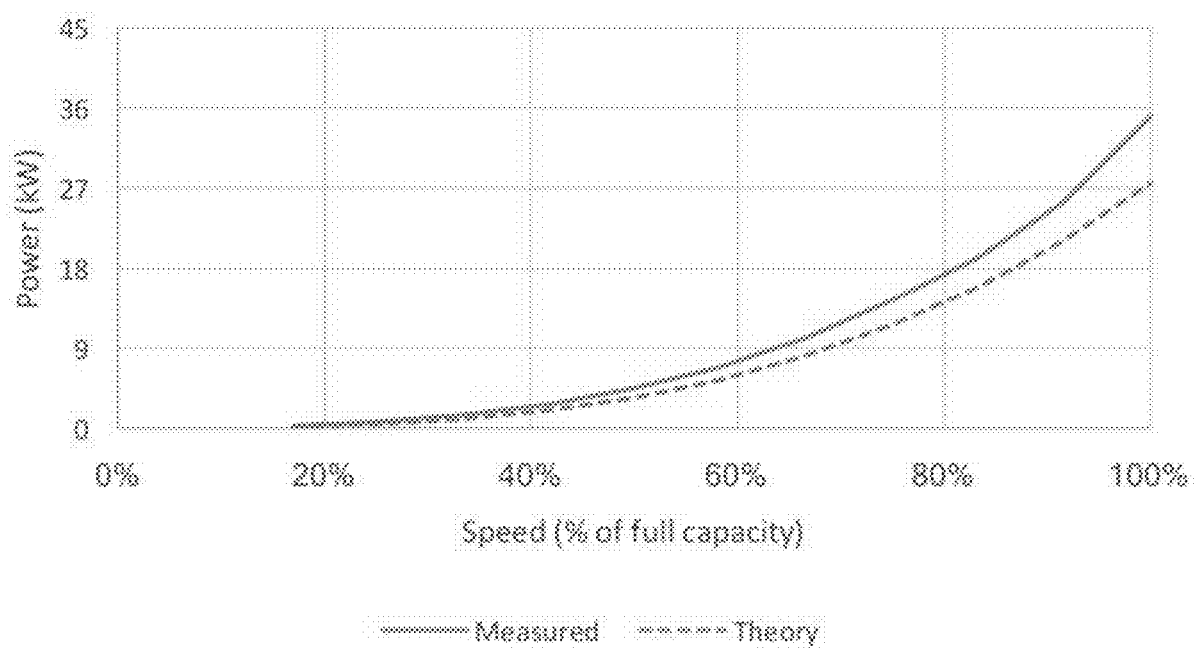
FIG. 4 shows the diagram of the relationship between measured and theoretical power draw with respect to the motor speed.

The speed of an AC induction motor is a function of two factors: (1) the number of motor poles and (2) the frequency of the applied power. The correlation between the speed and frequency is:

$$\text{Speed}[RPM] = \frac{120 \times \text{Frequency}[HZ]}{\text{Number of Poles}}$$

therefore, motor speed and frequency are linearly correlated; thus, a measurement of power draw versus motor frequency will provide a relationship with a pattern similar to that for a power draw versus motor speed (the latter of which is required for this analysis). FIG. 4 compares fan power draw with respect to motor speed using both theory (i.e., fan laws from FIG. 1) and empirical measurements conducted in real life scenarios. Differences in the shape of the relationships are most likely driven by:

(1) Coefficients that modify fan laws in FIG. 1 that are specific to each make and model of actual fan;
(2) Change in the actual system performance compared to the design system performance that is due to the integration of system components;
(3) In reality, non-uniform airflow profiles manifest as swirls and vortices and cause losses that are higher that the design loss coefficients and moving the system curve up.

In order to properly visualize the energy savings strategy, the phenomena are modeled using CONTAM. CONTAM is a physics-based tool, developed by the National Institute of Standards and Technology (NIST), that has been shown to realistically and accurately model pollutant dispersion in spaces. CONTAM is designed to calculate airflows (including infiltration, exfiltration, and room-to-room airflows driven by both natural and mechanical means) and resulting contaminant concentrations using sets of simultaneous equations solved by numerical methods. CONTAM allows a user to input a wide array of parameters that influence pollutant dispersion in confined spaces. A number of previous studies have used CONTAM for modeling gas concentrations in enclosed spaces such as parking garages, as well as for modeling demand-controlled ventilation (DCV) approaches.

The preferred embodiment algorithm for energy savings is built into the CONTAM model as a proportional control with the following structure: fans operate at a constant speed (i.e., 25% of full capacity of the motor speed of a given fan) until the average particular gas concentration (i.e., Carbon monoxide (CO)) equals 10 ppm; fan motor speed increases linearly until the average CO concentration reaches 35 ppm (i.e., by 3% for every additional 1 ppm of average CO concentration predicted); and fans operate at a constant speed of 100% of full capacity when average CO concentrations are 35 ppm and above.

The energy savings strategy of the preferred embodiment is modeled using a number of assumptions for (1) the timing and quantity of occupancy patterns of vehicles entering and exiting the garage, (2) per-vehicle CO emission rates of vehicles entering and exiting the garage, and (3) the types of fans used (i.e., including both real fan makes and models as well as generic curves based on the fan affinity laws described in FIG. 1). The assumptions are made in order to simplify the calculations, and the results have been verified using empirical real-life data comprising of actual energy measurements and savings.

The CONTAM model results are used to demonstrate, illustrate and corroborate expected fan operational behavior and resulting pollutant concentrations. Calculations for energy consumption, peak power draw, and energy savings compared to baseline conditions are performed using the modeled behavior.

The baseline control strategies to which the preferred embodiment is compared include:
(1) Standard variable flow (SVF), in which the fan is operated at 50% of maximum speed until CO gas concentrations reach 25 ppm, then is increased to 100% of maximum speed for all CO gas concentrations greater than 25 ppm.
(2) On-Off during operating hours, in which the fan operates at 100% of maximum speed when CO gas concentrations reach 25 ppm, and 0% of maximum speed when CO gas concentrations reach below 25 ppm.
(3) Always-on during operating hours, in which the fan operates at 100% of maximum speed regardless of the CO concentration.

Therefore, in all three other control strategies except the preferred embodiment, the fan operates as soon as one of the CO sensors detects a 25-ppm threshold.

Figure 5A:
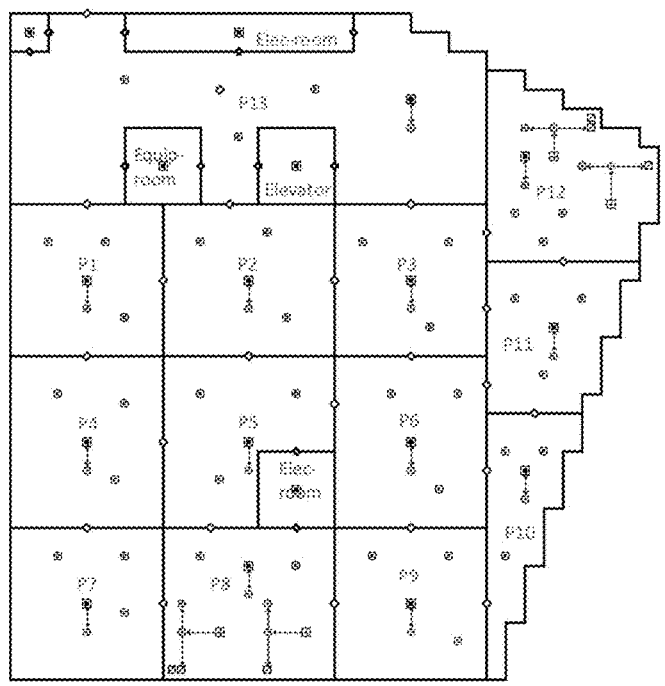
FIGS. 5A and 5B depict a CONTAM model for an existing parking structure, with FIG. 05A depicting the upper floor of the structure and FIG. 05B depicting the lower floor of the structure.
Figure 5B:
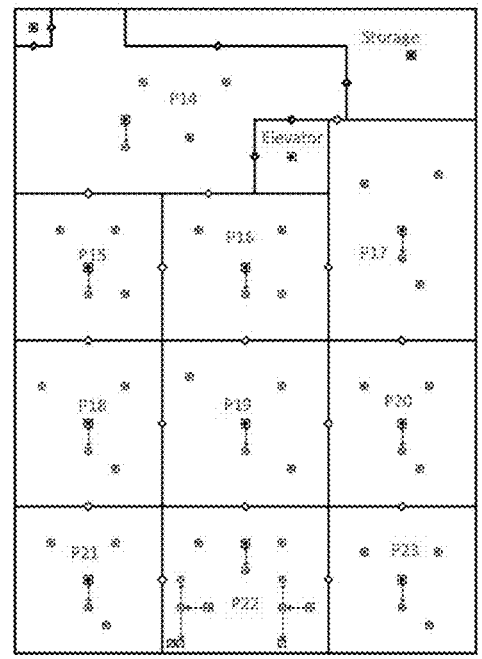

Looking at FIG. 5A and FIG. 5B, a CONTAM model of an enclosed parking garage is illustrated for the selected geometry. In this case, the CONTAM model represents an approximately 100,000 sq. ft garage space. Each zone has at least one gas sensor marked as "P" and traffic pattern for exit and entrance of vehicles. FIG. 5A depicts the upper floor plan of the enclosed parking garage, and FIG. 5B depicts the lower floor plan of the enclosed parking garage.

The fan control strategy of the preferred embodiment can be distilled into the following steps:
a. Defining a specific area in an enclosed space as a gas measurement zone;

b. Defining a predetermined measurement time and dividing said gas measurement time into equal time intervals;
c. Setting the base fan motor speed at a minimum base speed value;
d. Setting a minimum gas concentration value;
e. Setting a maximum gas concentration value;
f. Receiving input data primarily in the form of a gas concentration value from a plurality of gas sensors located in said gas measurement zone at each time interval;
g. Calculating the average gas concentration value of all the input data of said gas concentration values received from the plurality of gas sensors located in said measurement zone at each time interval;
h. Comparing all the average gas concentration values calculated at each time interval;
i. Taking and setting the highest value of said average gas concentration values as the high-average gas concentration value;
j. Comparing the minimum gas concentration value with the high-average gas concentration value;
k. Maintaining the fan motor speed at its minimum base speed value when the high-average concentration value is less than or equal to the minimum gas concentration value;
l. Adjusting the fan motor speed from its minimum base speed value by increasing the fan motor speed value at a specific percent increment value for every additional measured increment value of the high-average gas concentration value above the minimum gas concentration value until the high-average gas concentration value reaches the maximum gas concentration value;
m. Operating fan-motor units at a constant speed of 100 percent of full-motor capacity when the high-average gas concentration value is equal to or greater than the maximum gas concentration threshold value.

A measurement zone is defined as a specific area within the garage space where one or more gas sensors are assigned to measure the gas concentration in that specific area, as seen in FIGS. 5A and 5B.

Because gas concentrations fluctuate all the time based on the real-time conditions of the zone, a predetermined measurement time needs to be defined in order to obtain accurate readings of the gas concentration in a particular zone. In the preferred embodiment, the predetermined measurement time is set at 120 seconds, even though the measurement time may be set as short as 60 seconds, or as long as 180 seconds or more. That said, a longer measurement time is not desired because there may be situational changes (i.e. cars entering/leaving the garage in the interim) that the sensors may not account for when a longer measurement time (i.e. 300 seconds as the measurement time) is used.

In real life conditions, there are scenarios where a single gas sensor may be overloaded with high gas concentrations even though the remaining enclosed area's ambient gas concentration is well below the threshold value. A common example of this scenario occurs when a single car is idling for a period of time in a single spot. The emissions of the car idling will overload a single sensor and can potentially trigger an unwanted fan motor speed increase.

A common-sense approach to solving this issue would be simply taking the average value of all the sensor readings in the area and use that value to determine the fan motor speed increase. However, this simplistic approach may still fail or may not be compliant in jurisdictions requiring permissible exposure limits in enclosed spaces. In United States, the permissible exposure limit (PEL or OSHA PEL) is a legal limit for exposure to a chemical substance or physical agent such as loud noise. A PEL is usually given as a time-weighted average (TWA), defined as the average exposure over a specified period, usually a nominal eight-hour period.

Thus, the preferred embodiment takes additional steps to further refine the sampling method of the sensor values by taking the high-average value of the plurality of sensors present in the predetermined zone:

In the preferred embodiment, the predetermined measure time is set at approximately 120 seconds, divided to 12 equal intervals each 10 seconds long. At each interval, the software will take the readings of the plurality of the sensors and calculate the average value of all the sensors in the measurement zone. Once the average values of the sensors on each of the 12 intervals have been obtained, the software then compares the 12 values and uses the highest average value of the 12 intervals and use this value as the high-average value that will be compared to the minimum gas concentration value.

Example of the High-Average Gas Concentration Value Calculation

| Interval | Average Gas Reading (CO) |
| --- | --- |
| 10 s | 12.5 PPM |
| 20 s | 10.5 PPM |
| 30 s | 11.8 PPM |
| 40 s | 13.2 PPM |
| 50 s | 14.7 PPM |
| 60 s | 15.8 PPM |
| 70 s | 16.8 PPM |
| 80 s | 16.9 PPM |
| 90 s | 14.7 PPM |
| 100 s | 15.1 PPM |
| 110 s | 14.8 PPM |
| 120 s | 14.3 PPM |
| High-Average Value | 16.9 PPM (taken from the highest value of the 12 intervals) |

The preferred embodiment requires certain sensor values to be set at a certain range in order to maximize the energy savings potential. Referring back to Fan Affinity Laws seen in FIG. 1, the correlation between fan output and power usage and building code requirements dictate the minimum and maximum gas concentration boundaries where fans need to operate. These boundaries are different for different types of gases. For the purpose of this detailed description, the two gases discussed at length will be Carbon monoxide (CO) and Nitrogen dioxide ($NO_2$). It should be noted that other gases can be treated similarly to the other two gases above once the parameters have been established by government and/or safety regulations.

Setting the values outside of these ranges will result in less than optimal energy savings. if the minimum gas concentration value is set too low, then the fans will potentially ramp up prematurely, therefore wasting unneeded ventilation capacity when the gas concentrations have not reached significant levels that require ventilation at the ramped-up speed. Conversely, setting the minimum gas concentration value too high will result in the fan motors ramping up the speed when the gas concentration is more concentrated, thus requiring more operation time in order to dissipate the gas concentration and bring down the concentration value to acceptable levels.

As for CO, the preferred embodiment sets the minimum gas concentration value at 10 ppm. However, this value can be set as low as 4.0 ppm and as high as 24.0 ppm if not more. For CO's maximum gas concentration before the fan speeds are set to full motor unit speed capacity, the value is set at 35.00 ppm for the preferred embodiment, but this value can be set as low as 25.0 ppm, or as high as 45.0 ppm or higher. As for $NO_2$, the preferred embodiment sets the minimum gas concentration value at 1.0 ppm. However, this value can be set as low as 0.1 ppm and as high as 5.0 ppm if not more. For $NO_2$'s maximum gas concentration before the fan speeds are set to full motor unit speed capacity, the value is set at 5.0 ppm for the preferred embodiment, but this value can be set as high as 10.0 ppm or higher.

The measured increment value is the value used to ramp up the motor speed proportional to the high-average gas concentration value. This value determines how many stages the motor speed unit will ramp up proportionally to the high-average gas concentration value above the minimum gas concentration value until it reaches the maximum gas concentration value. For example, suppose a minimum gas concentration value of 10 ppm, a maximum gas concentration value of 35 ppm, and a measured increment value of 1.0 ppm for every ppm of high-average gas concentration value above the 10 ppm. The fan motor unit speed will have up to 25 ramping points (1 point for every 1 ppm), and a linear ramping up would yield a 4 percent motor unit speed increase for every 1 ppm increase above the 10 ppm. Increasing or decreasing the measured increment value will inversely increase or decrease the quantity of ramping up points between the minimum concentration value and maximum concentration value. The ramping up points are constrained by the limitations of the hardware design, i.e. there is a minimum speed in which the fan motor unit speeds can be ramped up.

The fan motor unit speed increments can be increased proportionally using percent fraction of the 100 percent full motor unit speed capacity. Alternatively, the increments can be measured using the fan motor unit's ventilation rate capacity, which usually specified by the manufacturer of the fan motor unit based on the size and horsepower of the fan motor unit in question. Thus, instead of setting the base minimum speed, a person having ordinary skill in the art may set the base minimum speed of the fan motor unit as the base minimum ventilation rate of the fan.

In terms of ventilation rate requirements, current building safety codes typically require 0.15 cfm/ft² as the minimum ventilation rate for fan motor units, and 0.75 cfm/ft² as the maximum ventilation rate for fan motor units. In light of these limitations, the preferred embodiment sets the minimum base ventilation rate value at a value between 0.100 cfm/ft² and 0.250 cfm/ft², and specific ventilation increment rate is set at a value between 0.006 cfm/ft² and 0.050 cfm/ft².

Figure 6A:
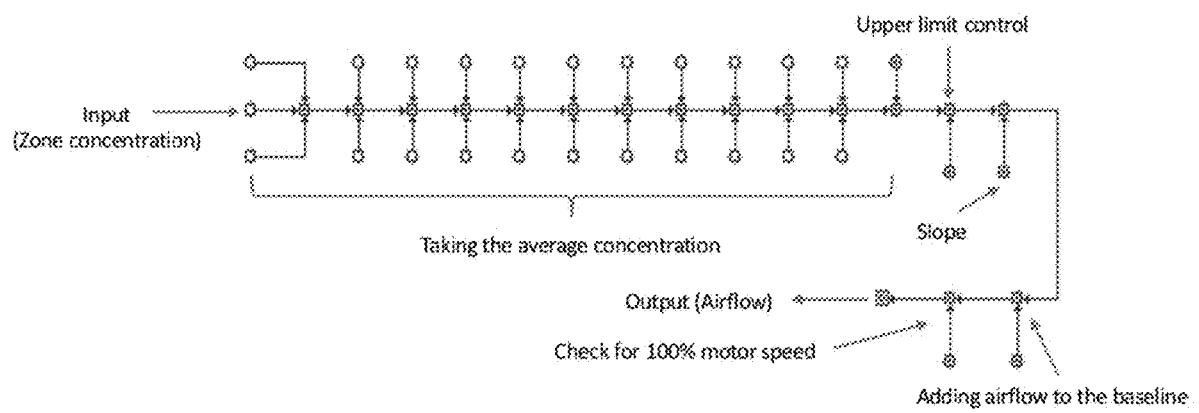
FIGS. 6A and 6B depict the control strategies implemented in CONTAM.

FIG. 6A shows the control network for the preferred embodiment control strategy. Transient particular gas concentrations in each zone are represented by the hollow box. This serves as the input of the control network. Just before the upper limit switch, the average concentration for the all the zones is calculated. An error signal by the upper limit control is obtained and compared to threshold concentration defined by the preferred embodiment control strategy, which is for example, 10 PPM for CO or 1 PPM for $NO_2$. If the error signal is positive, this signal is multiplied by the control strategy slope of the line, which connects the point of 10 ppm (average concentration) and 25% (motor speed) to 35 ppm and 100% in a linear manner. This slope multiplication signals the fan to provide the additional airflow above the baseline airflow at that specific concentration. Subsequently, the result of this multiplication is added to the baseline air flow to finally produce the required airflow designated by the preferred embodiment control strategy. Finally, the output signal from the average concentration is checked, and if it is more than 35 ppm, the airflow associated with 100% motor speed is set as the output.

Figure 6B:
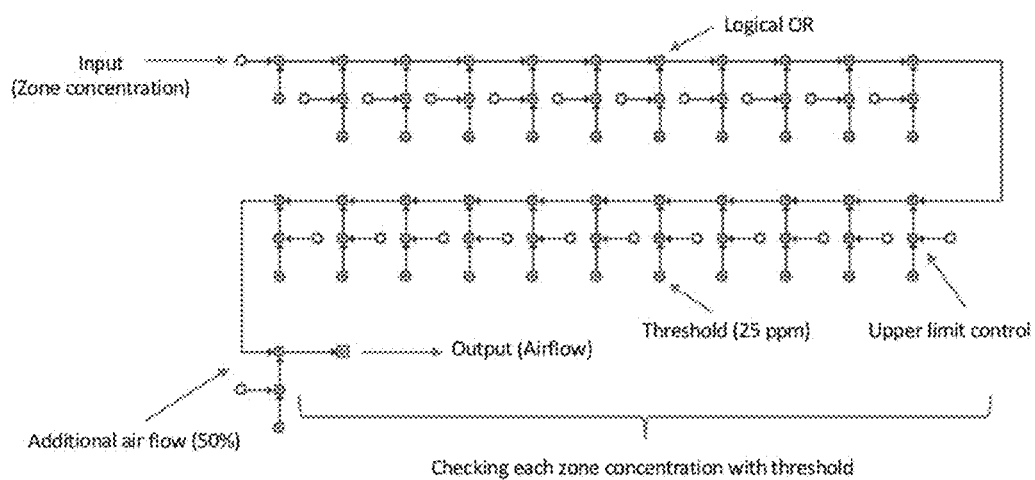

FIG. 6B depicts the control network for the SVF and On-Off control strategies. Similar to FIG. 6A, the inputs here are transient gas concentrations, specifically CO in this example, from each zone. The baseline airflow rate is defined as the airflow rate associated with 50% of motor speed. The CO concentration in each zone is compared to the threshold, which is defined as 25 ppm by the upper limit switch and logical OR. Logical OR is a control element in CONTAM which provides logical operation between inputs. The upper limit switches send binary signals (0 or 1) and logical OR compares these signals. If there is only one unit signal and the others are zero, then the logical OR provides the unit signal to the actuator which is a fan in this case. If any of the zone CO concentrations exceeds the threshold, a binary signal (unit) is sent to the fan to provide additional airflow. This additional airflow accounts for the remaining 50% of motor speed to increase the fan output to 100% of its full capacity. In the case of a zero signal, the fan continues to operate in its baseline status. The On-Off control strategy utilizes a similar control logic in CONTAM, with the only difference being that the baseline airflow is zero (i.e., fan off) rather than 50% as in the SVF control strategy.

The preferred embodiment also works with different configurations of fans, and energy use can be calculated mathematically using known fan law principles and mathematical interpolations. This section explores the use of two alternative fan types in the parking garage to illustrate the impacts of alternative fan selection on the resulting estimates of power draw and energy consumption. Table 1 shows the calculation of airflow in upper and lower floors depicted previously in FIGS. 5A and 5B being served by both fans. Another parameter for the selection of different fan configuration is the static or total pressure value, which can be obtained through the system resistance curve depicted in FIG. 7. With pressure (static or total) and airflow, a person having skilled in the art can select different fan configurations to be implemented with the preferred variable control logic. It should be noted that in FIG. 7, only the system curve is used to calculate the static pressure values, which for the model is set at 0.25 in. wg and 0.55 in. wg.

TABLE 1

Calculations of the original fans used in Parking Garage depicted in FIGS. 5A and 5B.

| Floor | Q (cfm) | Fan Model |
| --- | --- | --- |
| Upper floor (FIG. 5A) | 28,000 + 14,000 = 42,000 | Greenheck Catalog: 49-USF-400 AF |
| Lower floor (FIG. 5B) | 28,000 | Greenheck Catalog: 30-USF-300 BI |

Based on affinity law 3b as depicted in FIG. 1 and the system curve provided by the designer the static pressure in 42000 cfm for upper floor and 28000 cfm for the lower floor can be estimated as:

$$\frac{P_{(42000 cfm)}}{P_{(56130 cfm)}} = \left(\frac{Q_{42000}}{Q_{56130}}\right)^2 \rightarrow P_{(42000 cfm)} = \left(\frac{42000}{56130}\right)^2 \times 1 = 0.55 \text{ in. } wg$$

-continued for upper floor $$\frac{P_{(28000cfm)}}{P_{(56130cfm)}} = \left(\frac{Q_{28000}}{Q_{56130}}\right)^2 \to P_{(28000cfm)} = \left(\frac{28000}{56130}\right)^2 \times 1 = 0.25 \text{ in. } wg$$

for upper floor

Specifying the static pressure related to the air flows in the system resistance curve in the above figures results in reaching exactly the calculated numbers in the above equations To assess impacts of the fan selections on the energy and power calculations, this study conducts a design approach to consider two different fans: (1) an Alternative Centrifugal Fan Model, and (2) an Alternative Axial Fan model. This selection of centrifugal and axial fans allow consideration of two types of common fans based on the direction of flow through the impellers.

While axial fans draw air in parallel to the axis of rotating blades, in centrifugal fans move air radially from the direction of the incoming air. Centrifugal fan impellers produce pressure from the (1) centrifugal force created by rotating the air column contained between the blades and (2) kinetic energy imparted to the air by its velocity leaving the impeller. This velocity is a combination of rotational velocity of the impeller and airspeed relative to the impeller. When the blades are inclined forward, these two velocities are cumulative; when backward, oppositional. Backward-curved blade fans are generally more efficient than forward-curved blade fans.

Assuming the flow rate for the upper floor remain the same as 42,000 cfm and pressure of 0.55 IWC in as well as the lower floor maintain the same 28,000 cfm with pressure of 0.25 IWC. Therefore, based on the Greenheck Catalog the upper floor fan is 40-USF-400 AF and the lower floor fan is 33-USF-400 AF.

Figure 7:
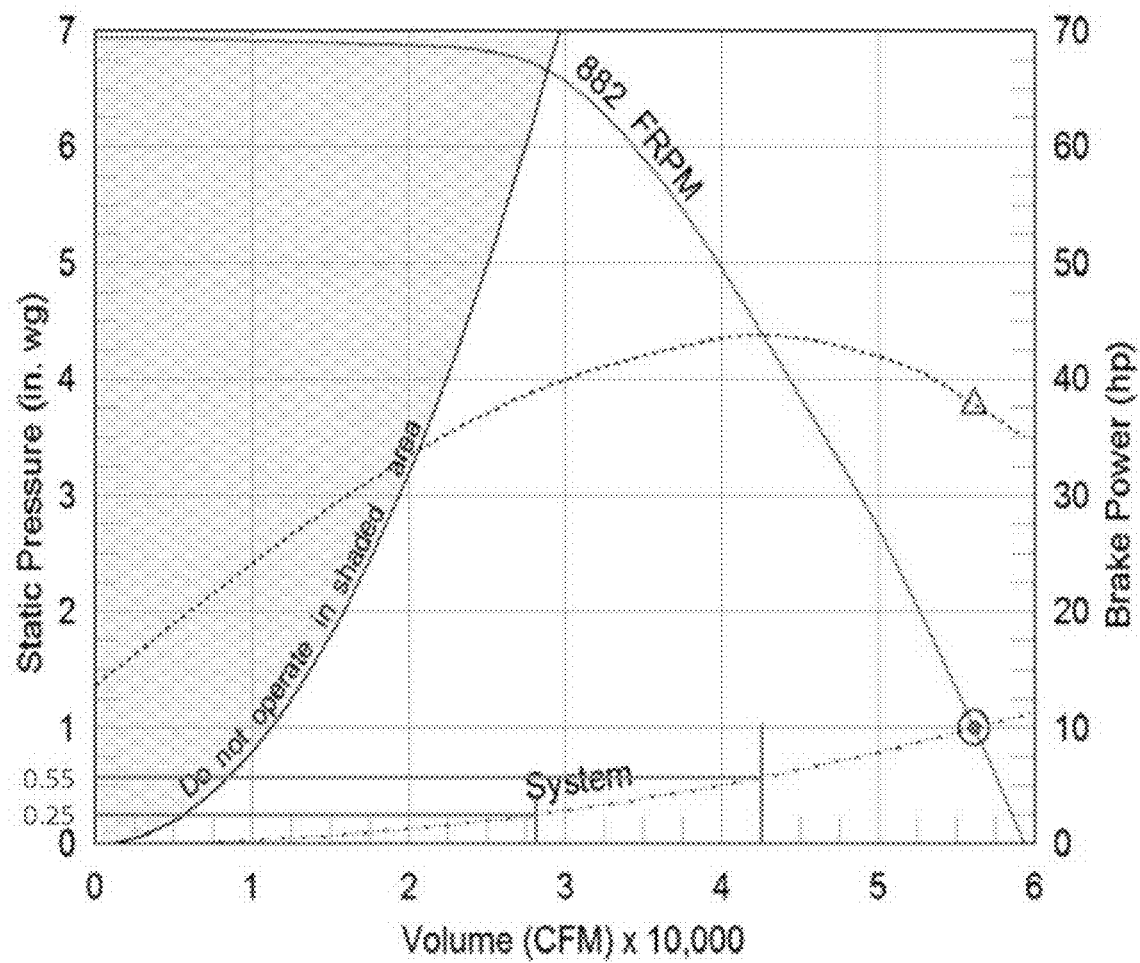
FIG. 7 is a graph depicting the original fan curves and associated calculations.
Figure 8:
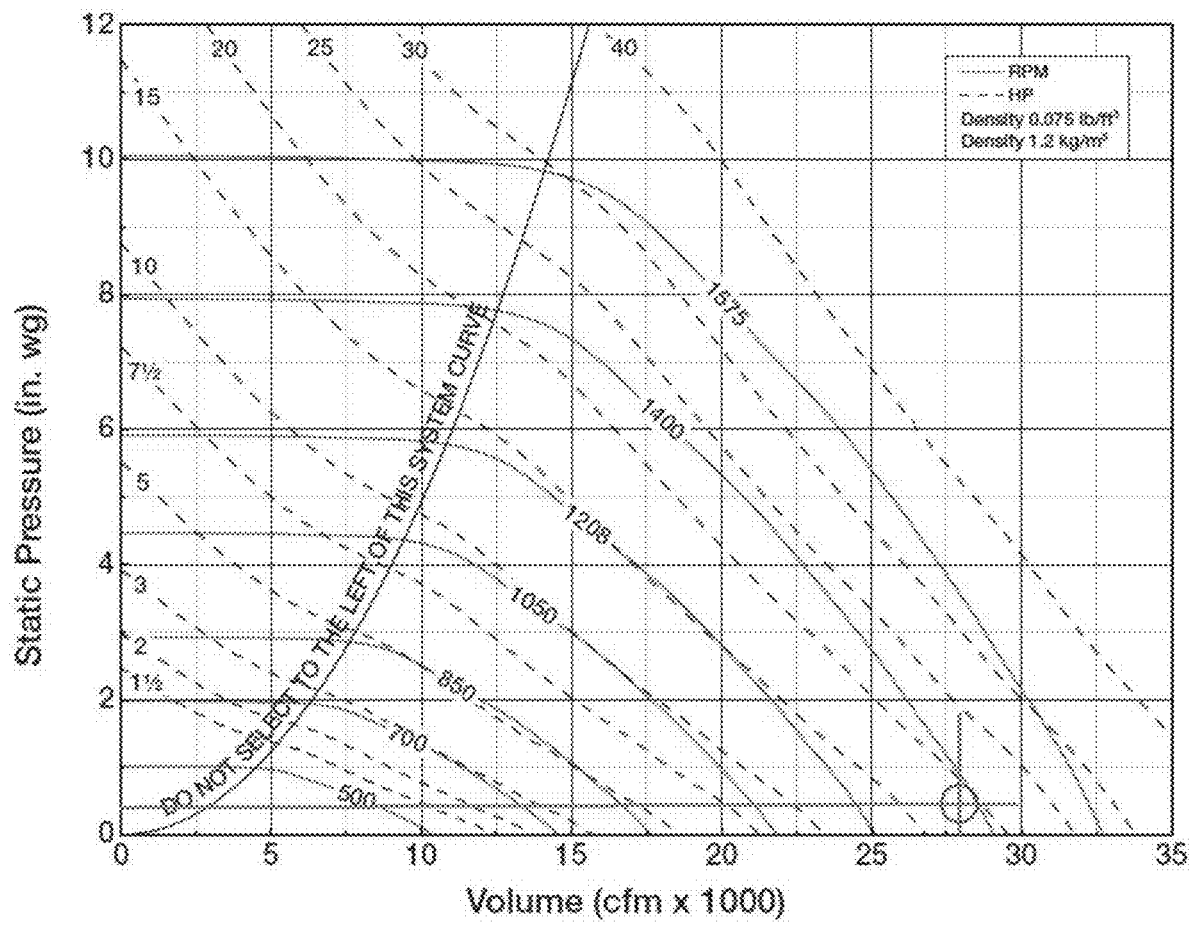
FIG. 8 is a graph depicting alternative upper floor fan curves using centrifugal fans and associated calculations.

To calculate values for the alternative centrifugal fans used in the upper floor parking garage structure previously depicted in FIG. 5A, using the base airflow rate of 42,000 cfm, pressure of 0.55 in W; the graphical chart depicted in FIG. 7 can provide Brake Horsepower (BHP) figures for the fans, which is then calculated as seen in Table 2 below.

TABLE 2

Calculations of the upper floor fan for the alternative 1

| Q (cfm) | P (in) | RPM | BHP | W (kW) |
|---|---|---|---|---|
| 42,000 | 0.5 | 1,153 | 29.38 | 21.88 |
| 42,000 | 1 | 1,179 | 32.33 | 24.08 |

By linear extrapolation for RPM of 1,155.6 and BHP of 29.67, the power draw is 22.11 kW. Then, based on the affinity law 3c in FIG. 1:

$$\frac{W_1}{W_2} = \left(\frac{Q_1}{Q_2}\right)^3$$

$$\begin{cases} W_{100\%} = 22.11 \text{ kW} \\ W_{50\%} = 0.5^3 \times 22.11 = 2.76 \text{ kW} \\ W_{25\%} = 0.25^3 \times 22.11 = 0.34 \text{ kW} \end{cases}$$

Figure 9:
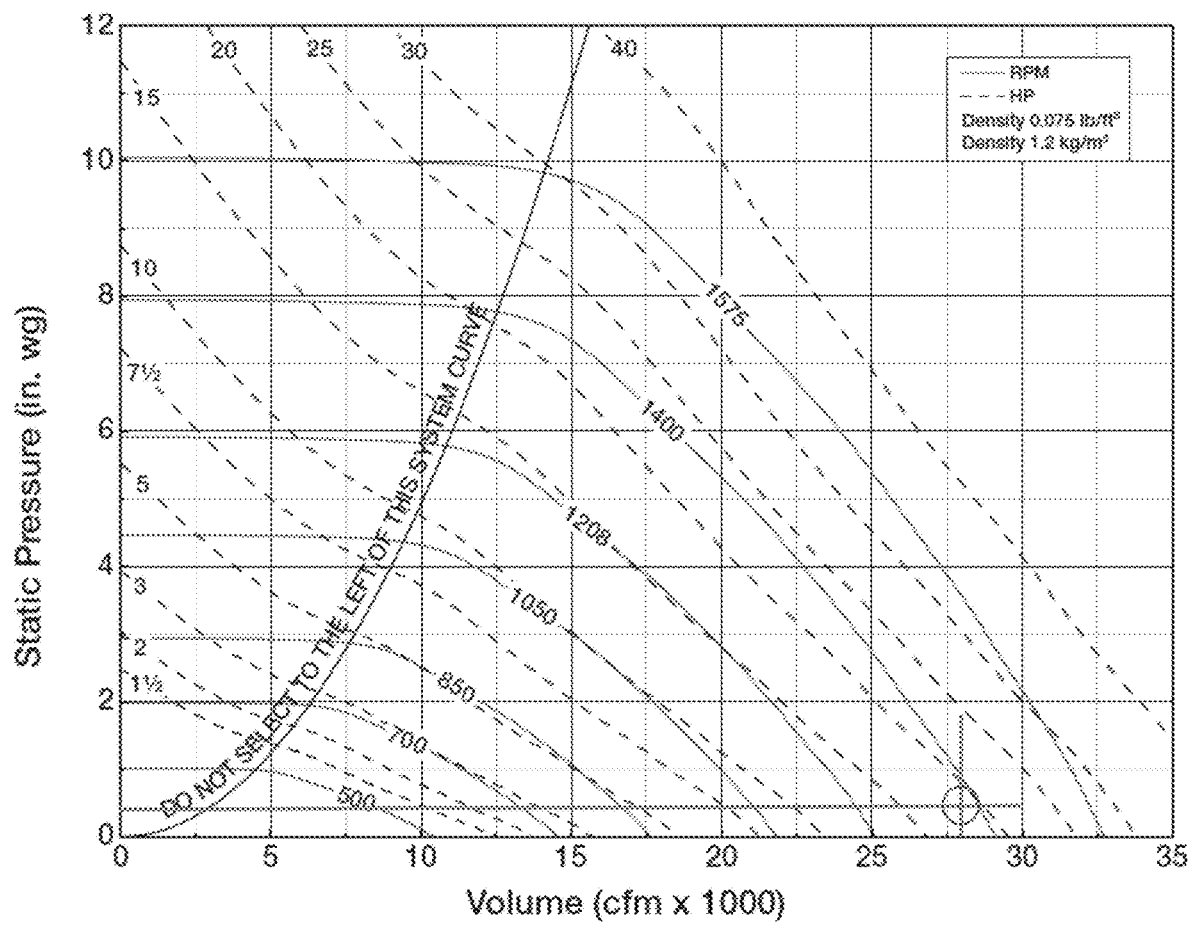
FIG. 9 is a graph depicting alternative lower floor fan curves using centrifugal fans and associated calculations.
Figure 10:
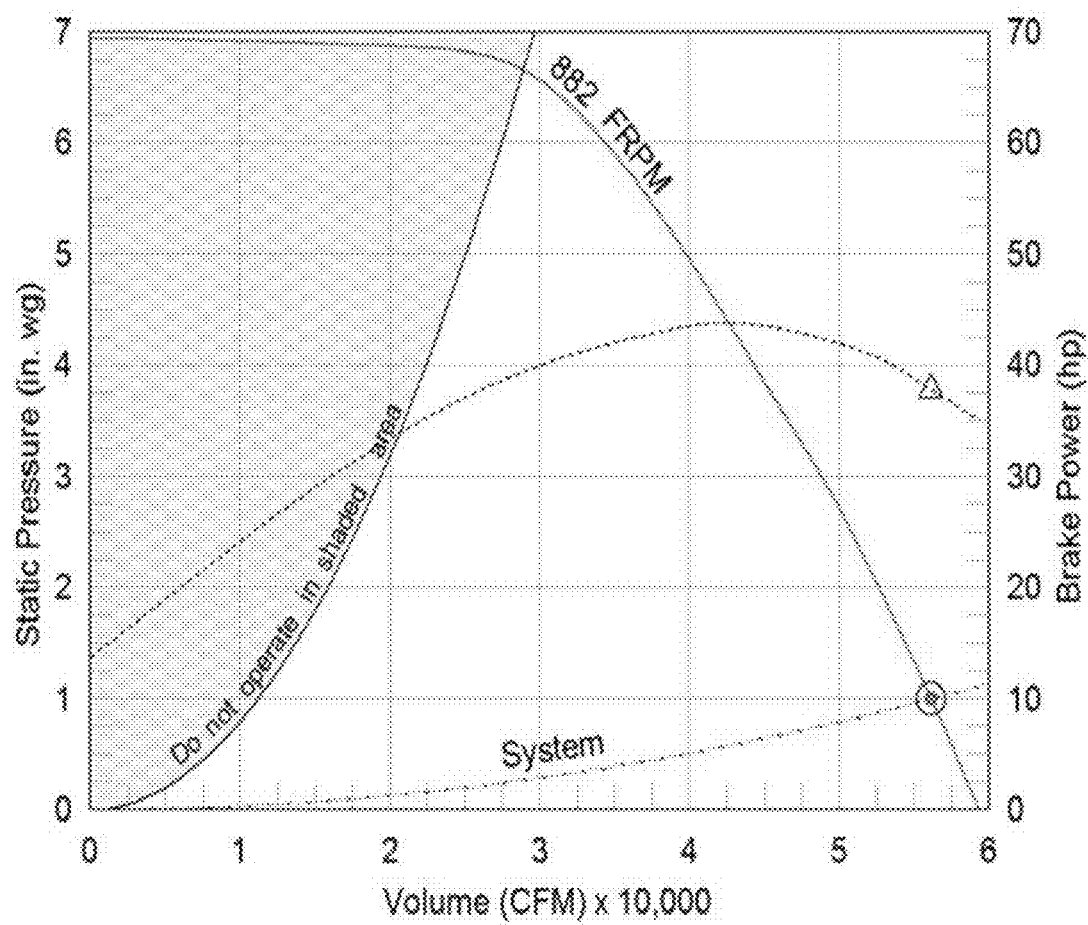
FIG. 10 is a graph depicting alternative upper floor fan curves using axial fans and associated calculations.

The lower floor centrifugal fan calculations are calculated using the following assumptions: a base airflow rate of 28,000 cfm, pressure of 0.25 in W, and using the fan curves depicted in FIG. 9 and their associated calculations, the BHP of the Centrifugal Fan Calculations in the lower floor model of the parking garage previously depicted in FIG. 5B are calculated and produced in Table 3 below.

TABLE 3

Calculations of BHP and kW of the lower floor fan in FIG. 5B using Centrifugal Fans

| Q (cfm) | P (in) | RPM | BHP | W (kW) |
|---|---|---|---|---|
| 26,000 | 0.5 | 1,284 | 15.36 | 11.44 |
| 28,500 | 0.5 | 1,401 | 19.84 | 14.78 |

By using linear regression with airflow equals to 28,000 cfm, pressure of 0.5 in, RPM of 1,377, and BHP of 18.94, the calculated power draw is 14.11 kW.

TABLE 4

Calculations of the lower floor fan for the Alternative Centrifugal Fans for same pressure

| Q (cfm) | P (in) | RPM | BHP | W (kW) |
|---|---|---|---|---|
| 26,000 | 1 | 1,319 | 17.3 | 12.88 |
| 28,500 | 1 | 1,432 | 21.8 | 16.27 |

By linear interpolation:

TABLE 5

Calculations of the lower floor fan for the alternative 1 power

| Q (cfm) | P (in) | RPM | BHP | W (kW) |
|---|---|---|---|---|
| 28,000 | 1 | 1,409 | 20.93 | 15.6 |

By linear extrapolation:

TABLE 6

Calculations of the lower floor fan for the alternative 1 power

| Q (cfm) | P (in) | RPM | BHP | W (kW) |
|---|---|---|---|---|
| 28,000 | 0.25 | 1,361.7 | 17.94 | 13.36 |

Using affinity laws 3c from FIG. 1:

$$\begin{cases} W_{100\%} = 13.36 \text{ kW} \\ W_{50\%} = 0.5^3 \times 13.36 = 1.67 \text{ kW} \\ W_{25\%} = 0.25^3 \times 13.36 = 0.21 \text{ kW} \end{cases}$$

In contrast to centrifugal fans, axial-flow fan impellers produce pressure principally by the change in air velocity as it passes through the impeller blades, with none being produced by centrifugal force. These fans are divided into three types: propeller, tubeaxial, and vaneaxial. Propeller fans, customarily used at or near free air delivery, usually have a small hub-to-tip-ratio impeller mounted in an orifice plate or inlet ring. Tubeaxial fans usually have reduced tip clearance and operate at higher tip speeds, giving them a higher total pressure capability than the propeller fan. Vaneaxial fans are essentially tubeaxial fans with guide vanes and reduced running blade tip clearance, which give improved pressure, efficiency, and noise characteristics. The selected catalog of fans showed that the axial fans have lower flow rate compared to the centrifugal fans. Consequently, to provide exact flow rate, there is a need to use 6 and 4 fans for the upper and lower floors in the example parking garage structure depicted in FIG. 5A and FIG. 5B, respectively.

TABLE 7

Calculations of the original fans

| Floor | Q (cfm) | Pressure (in W) | Fan Model |
|---|---|---|---|
| Upper floor | 6 × 7,000 = 42,000 | 0.0156 | Greenheck Catalog: VAD-20H-14 |
| Lower floor | 4 × 7,000 = 28,000 | 0.0156 | Greenheck Catalog: VAD-20H-14 |

Pressure also can be calculated from $$\left(\frac{7,000}{56,000}\right)^2 = 0.015$$

in. wg.

Figure 11A:
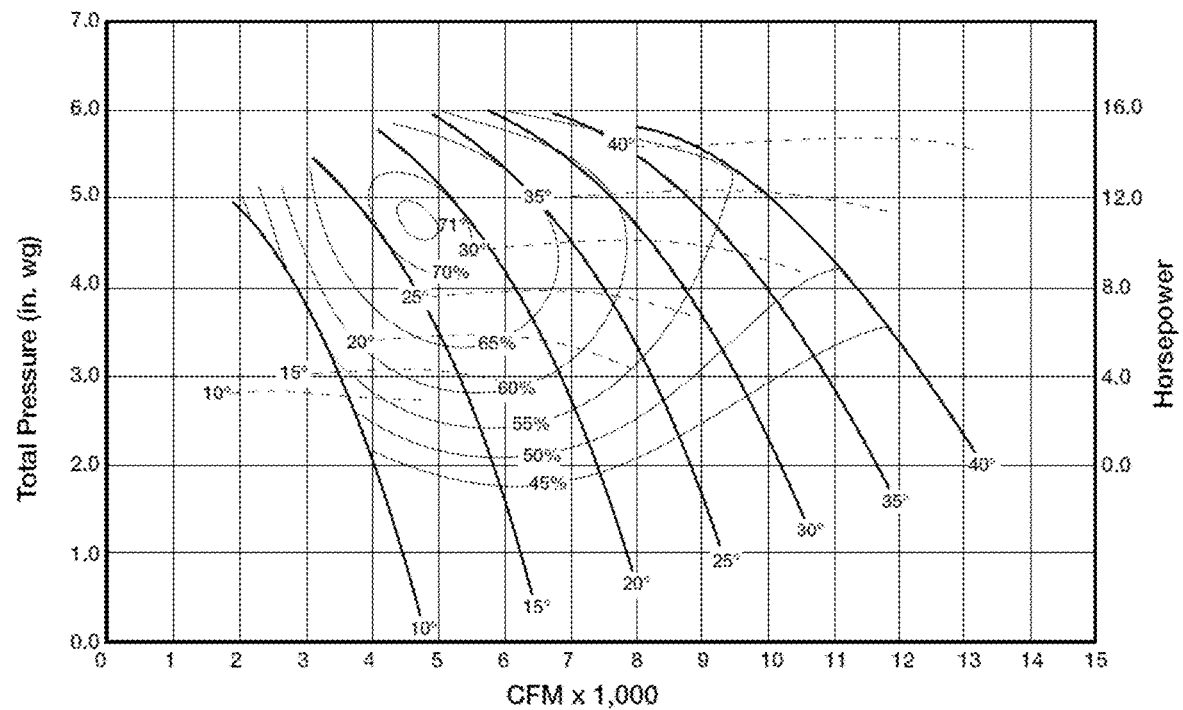
FIGS. 11A and 11B are graph showing alternative axial fan curves and associated calculations, with FIG. 11A for 3,500 RPM models and FIG. 11B for 1,750 RPM models.
Figure 11B:
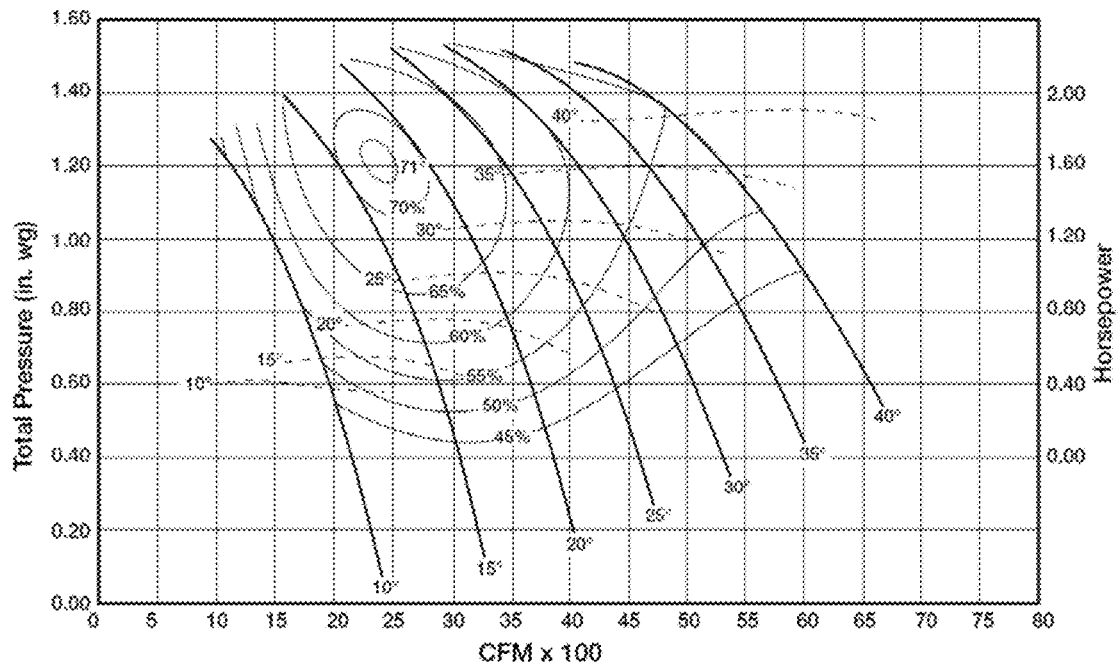
Figure 12A:
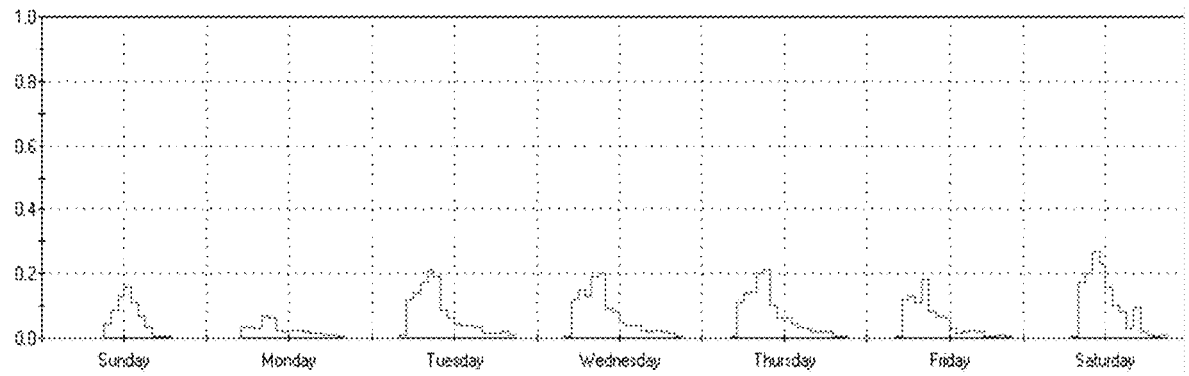
FIGS. 12A and 12B show normalized vehicle traffic patterns for a parking garage, with FIG. 13A showing incoming cars and FIG. 13B showing outgoing cars.
Figure 12B:
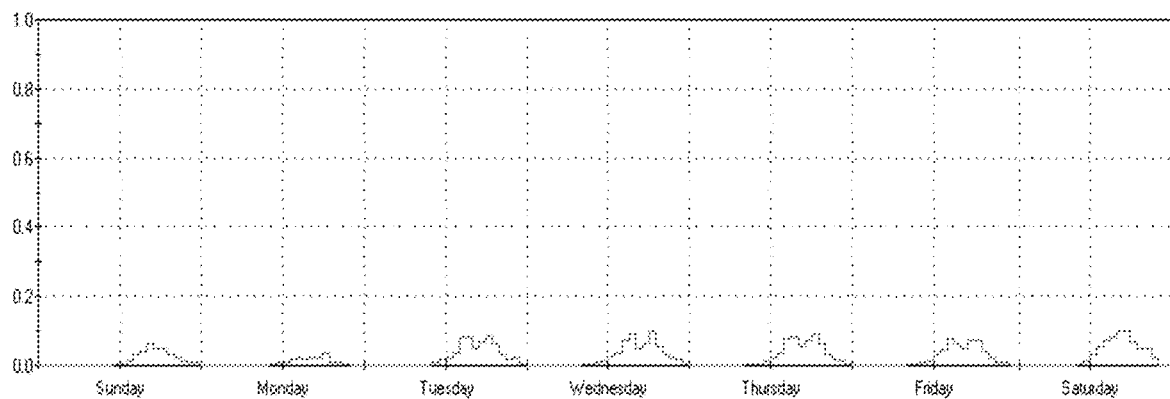
Figure 13A:
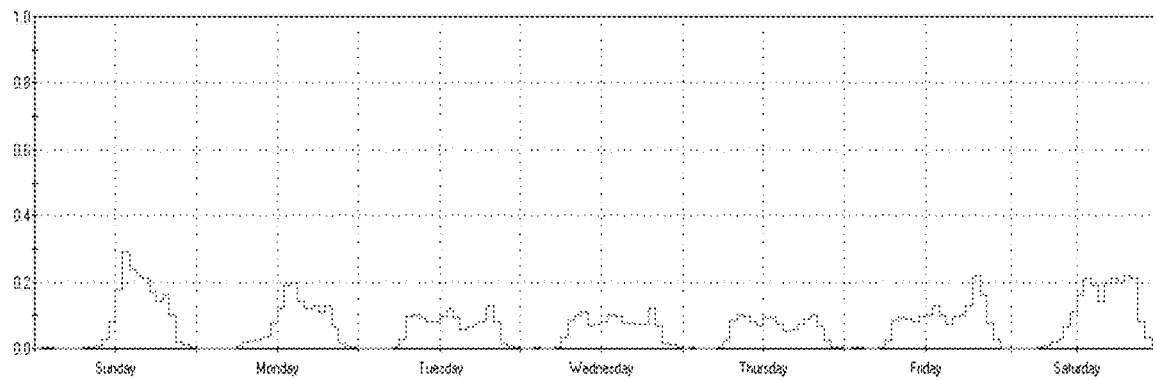
FIGS. 13A and 13B show normalized vehicle traffic patterns for another parking garage, with FIG. 13A showing incoming cars and FIG. 13B showing outgoing cars.
Figure 13B:
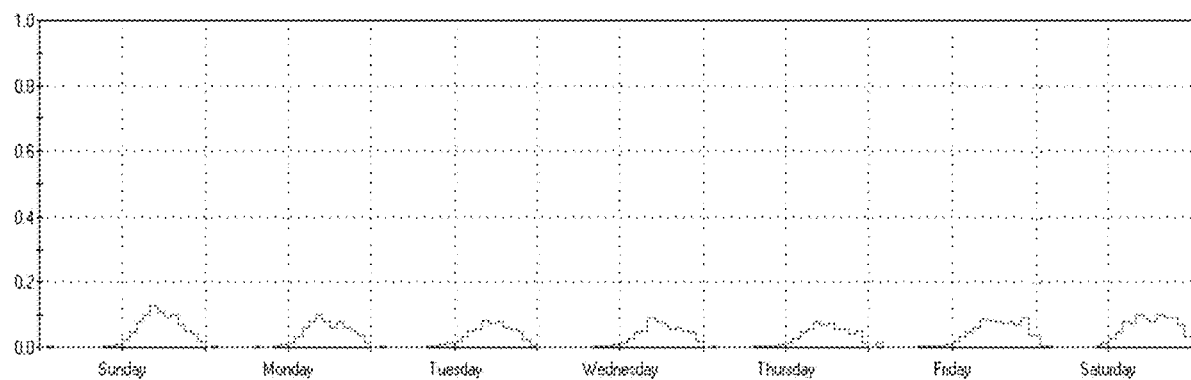

For estimation of power draw in full motor speed capacity, there is a need to know the airflow and pressure (static or total). After calculating the total pressure (0.65 in. wg) and having the airflow of 7,000 cfm, a pitch angle of 16 degrees as indicated in lower blue circle in FIG. 11a is considered. For assessing the horsepower, we intersect the airflow (7,000 cfm) with dotted lines attributed to pitch angel of 16 degrees (upper blue circle in FIG. 11b) then we horizontally continue the line to the left of the figure until it intersects the vertical axis for power draw (horsepower) estimation which can be considered as 4 HP or 4×0.75=3 kW. 0.75 is the factor which converts the horsepower to kilowatt. For upper floor, this garage can have 6 and for lower floor this garage can have 4 fans. Therefore, the power consumption for upper floor would be 6×3=18 kW and for the lower floor is estimated as 4×3=12 kW. The exact scenario happens when the fan works at 50% of its full capacity (0.5×35,00=1770 rpm or 0.5×7,000=3,500 cfm) as it is shown in FIG. 11B. Similar to the alternative centrifugal fan section, for 25% of motor speed power draw estimation, we used the affinity laws which relates power and airflow (3b formula in FIG. 1). Finally, total and each floor power draw estimation is summarized in Table 8.

TABLE 8

Summary of upper, lower, and total power draw for axial fan configuration

| Upper Floor | Lower Floor | Total |
|---|---|---|
| $W_{100\%} = 18$ kW | $W_{100\%} = 12$ kW | $W_{100\%} = 30$ kW |
| $W_{50\%} = 1.8$ kW | $W_{50\%} = 1.2$ kW | $W_{50\%} = 3$ kW |
| $W_{25\%} = 0.35$ kW | $W_{25\%} = 0.23$ kW | $W_{25\%} = 0.58$ kW |

This energy savings strategy used in the preferred embodiment also uses assumptions for vehicle occupancy and traffic patterns. To illustrate this further, occupancy data and traffic patterns from two actual existing parking garages are used (Identified as Garage 1 and Garage 2 for the purposes of this detailed description). For both, occupancy pattern data from the week with the highest recorded occupancy was selected for the implementation in CONTAM model. In addition, two assumptions for per-vehicle CO gas emission rates include: (1) majority "cold start" conditions and (2) majority "warm start" conditions. The "cold start" conditions assume the majority of vehicles have been sitting for a long period of time prior to engine starting, and thus have high CO emission rates. Conversely, the "warm start" conditions assume the majority of vehicles are started after sitting for less than 12 hours, and thus their emission rate is lower.

Newer vehicles use a catalytic converter to reduce tailpipe emissions, including CO. The California Air Resources Board (CARE) maintains a database of emission rates for various passenger vehicles called Emission Factors (EMFAC) (CARB, 2017a, 2017b). Using this data set and assuming a vehicle speed of 15 mph in the parking garage and an average vehicle vintage of 2010, we assume that the CO emission rate of a running engine is 0.13 g/min. it is assumed that the average amount of time that a vehicle is looking for an open parking space is 3 minutes (as a likely worst-case scenario), with the same average running engine emission rate for the duration of this time.

Cold start CO emissions requires more careful consideration. It is further assumed that the average time of a vehicle leaving the parking garage is 1 minute. CO emissions profiles can vary drastically in the timeframe of just 1 minute if the engine is started cold (i.e., has not been on for a few hours). In addition to the issue of "cold starts" referring to engine status alone, ambient temperature also has a major influence on CO emissions (i.e., "cold cold starts," or cold starts during cold conditions, will emit more CO than "warm cold starts," or cold starts during warm conditions).

Figure 14:
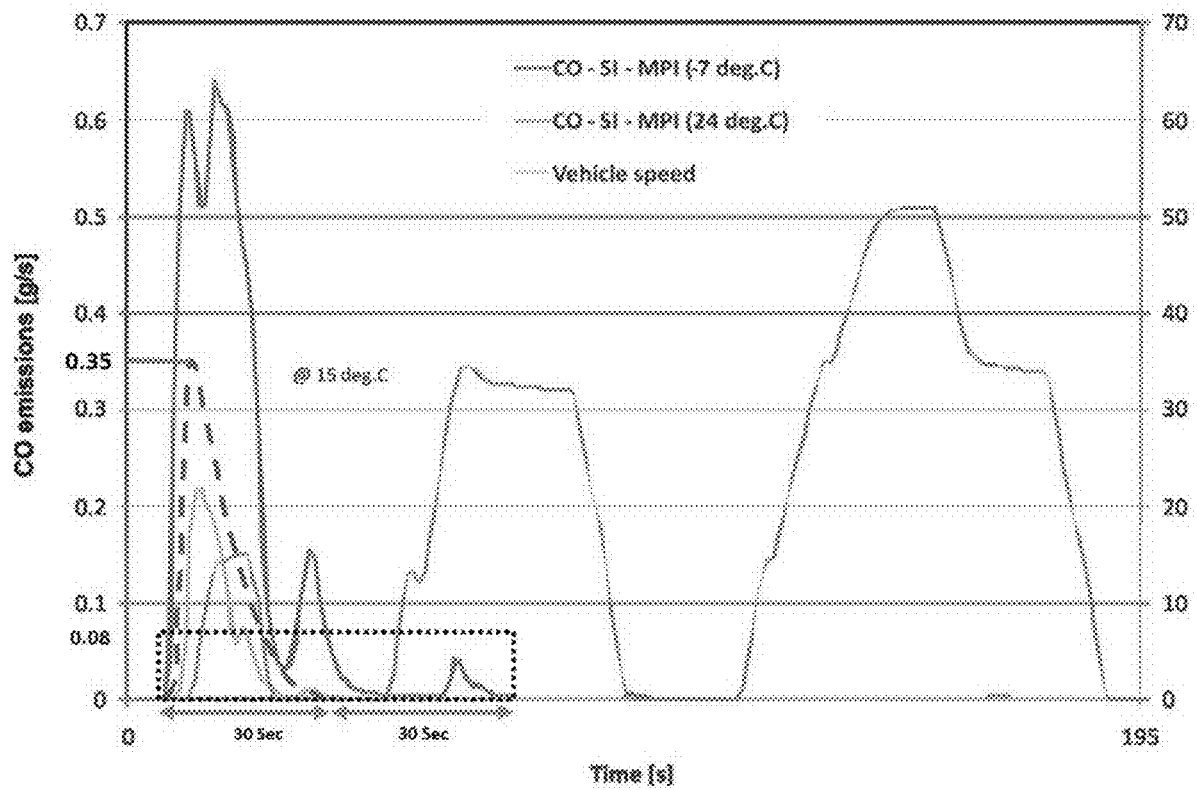
FIG. 14 is a graph showing an example of CO emissions profile during cold start conditions in both cold and warm temperature conditions.

Much of the literature data on cold start emissions dates back to vehicles from the 1990s or earlier. A 2014 EPA report showed that from year 2000 to 2010 the cold start CO emission rate form light vehicles dropped by more than 50% and is predicted to decrease by more than 80% in 2025. However, details of "cold-cold" and "warm-cold" starts remains today. As an example of this dynamic, FIG. 14 shows the CO emission rate from a spark ignition (SI) vehicle in cold start mode under ambient temperatures of −7° C. ("cold cold") and 24° C. ("warm cold") for a modern vehicle engine (Bielaczyc et al., 2013). Clearly, temperature has a big impact on resulting emissions, and the emission profile generally follows a pattern of having a high peak in the first 30 seconds followed by a decrease toward steady conditions in the subsequent 30 seconds.

In this model, the average temperature of city in which parking garages are located is taken to be 15° C. Thus, it is estimated that the time-varying CO emission profile by interpolating between the two curves in FIG. 14. (the curve depicted in dotted line). Instead of modeling the transient peak and decay period of the line in 30 seconds, an average of the emission rate for the entire 60 second period is taken and it is assumed that the average time a vehicle takes to leave the parking garage is 1 minute. Thus, the area of the dotted triangle in the graph can be estimated to be the same as the area of the dotted black rectangle, which can be used to estimate the average cold start emission rate at this temperature.

$$\text{dotted triangle area} = \frac{0.35 \times 30}{2} - 0.1 \frac{0.35 \times 30}{2} = 4.7$$

Note that a deduction of 10% of the area due to the inward curvature of the hypotenuse, yielding:

$$\text{Average CO emission rate in first 60 seconds} = \frac{4.7}{60} = 0.078 \frac{g}{s} = 4.7 \frac{g}{\min}$$

Next, the modeling assumes the following two engine start scenarios: cold start conditions, and combined cold-warm start conditions. In the first scenario, it is assumed that all of the engine starts would emit 80% of CO in the complete cold start mode, which is defined as a successful vehicle start following a "soak time" of 720 minutes (12 hours) or more (Gao and Johnson, 2009). Thus, the average emission rate of all vehicles leaving the garage is calculated as:

$$\text{Average CO emission rate} = 4.7 \times 0.8 = 3.76 \frac{g}{\min}$$

Figure 15:
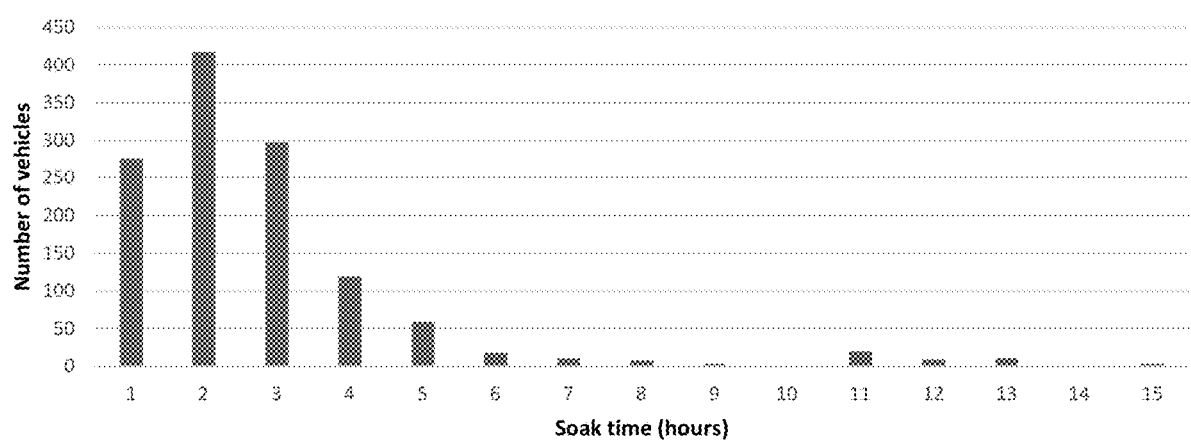
FIG. 15 is a graph depicting CO soak time distribution for a parking garage structure.

In the second scenario, it is assumed that a distribution of the vehicle soak times and the average of emission rate in each soak time bin to estimate a more realistic average emission rate. FIG. 15 illustrates the soak time distribution from a randomly selected day of transient vehicle entrance and exit data from Parking Garage 2.

Based on the data in FIG. 15, the majority of vehicles in the garage have a soak time of less than 5 hours and that 22% of vehicles in the garage had a soak time of less than 1 hour. Table summarizes these same data grouped in a smaller number of time bins. Almost 85% of the vehicles in this garage had a soak time of less than 4 hours. Therefore, it is assumed that 85% of vehicles in the model garages have a "warm start" and the remaining 15% have a "cold start" when their engines start and the drivers head for the exits.

TABLE 9

Soak time and percentage of vehicles

| Soak Time (hours) | Percentage of vehicles (%) |
|---|---|
| 0-1 | 22 |
| 1-2 | 33 |
| 2-3 | 23 |
| 3-4 | 9.5 |
| >4 | 12.5 |

Figure 16:
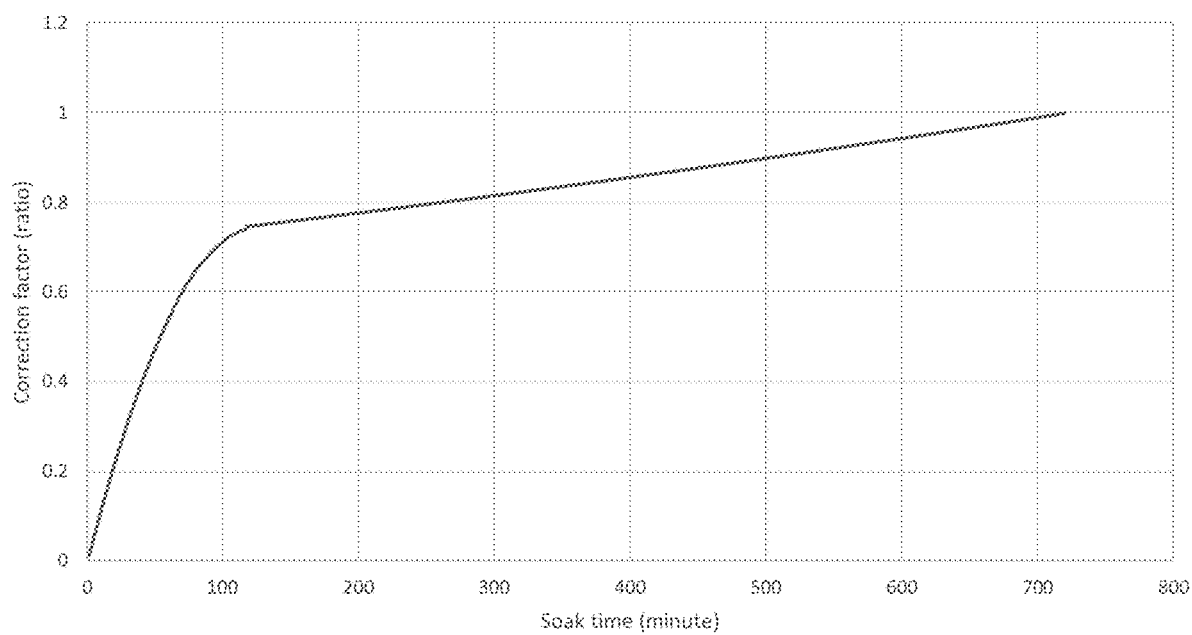
FIG. 16 is a graph depicting CO emission correction factor ratio based on engine soak time.
Figure 17:
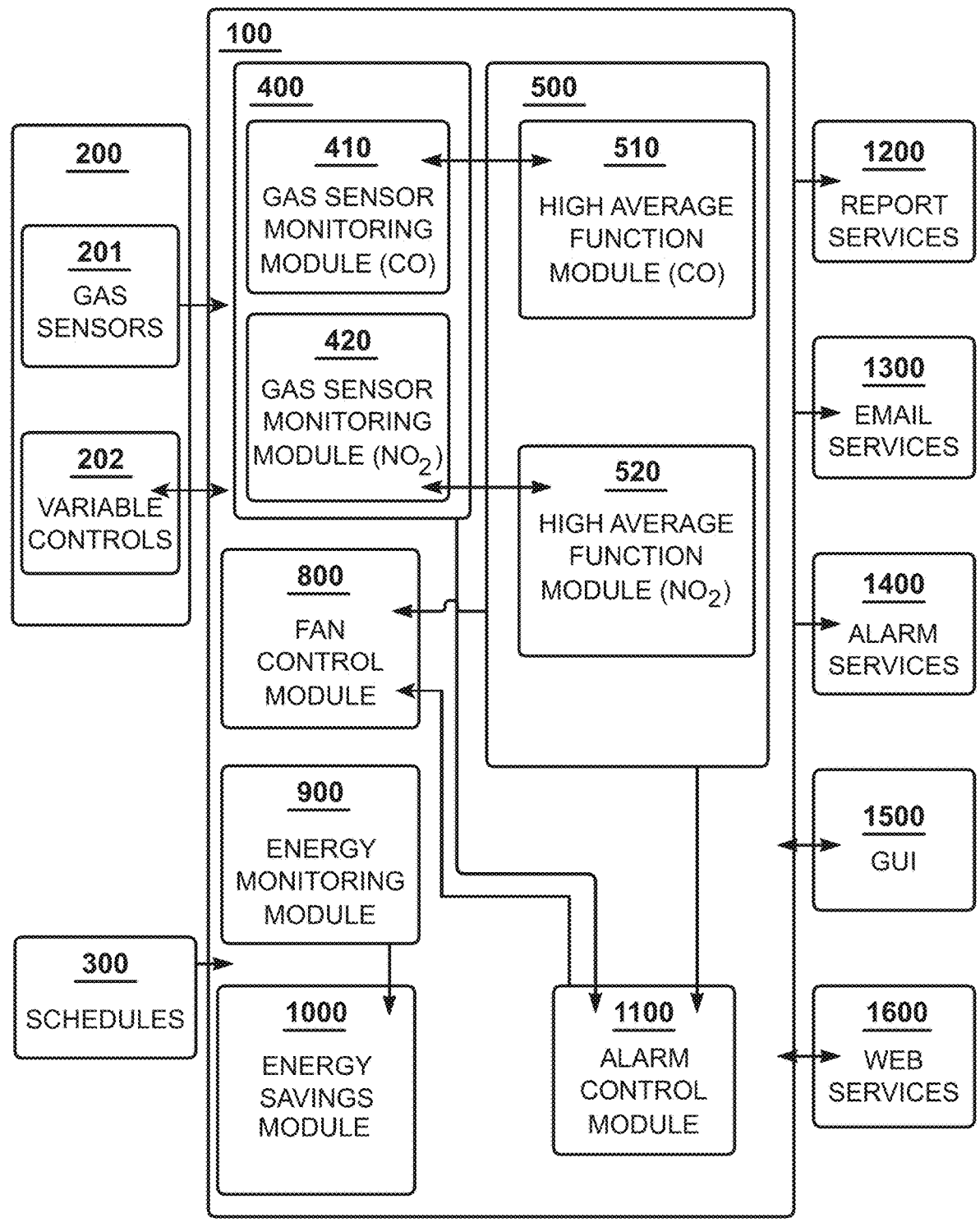
FIGS. 17-21 are block diagrams showing an example of the implementation of the garage ventilation control logic as a set of software modules.
Figure 18:
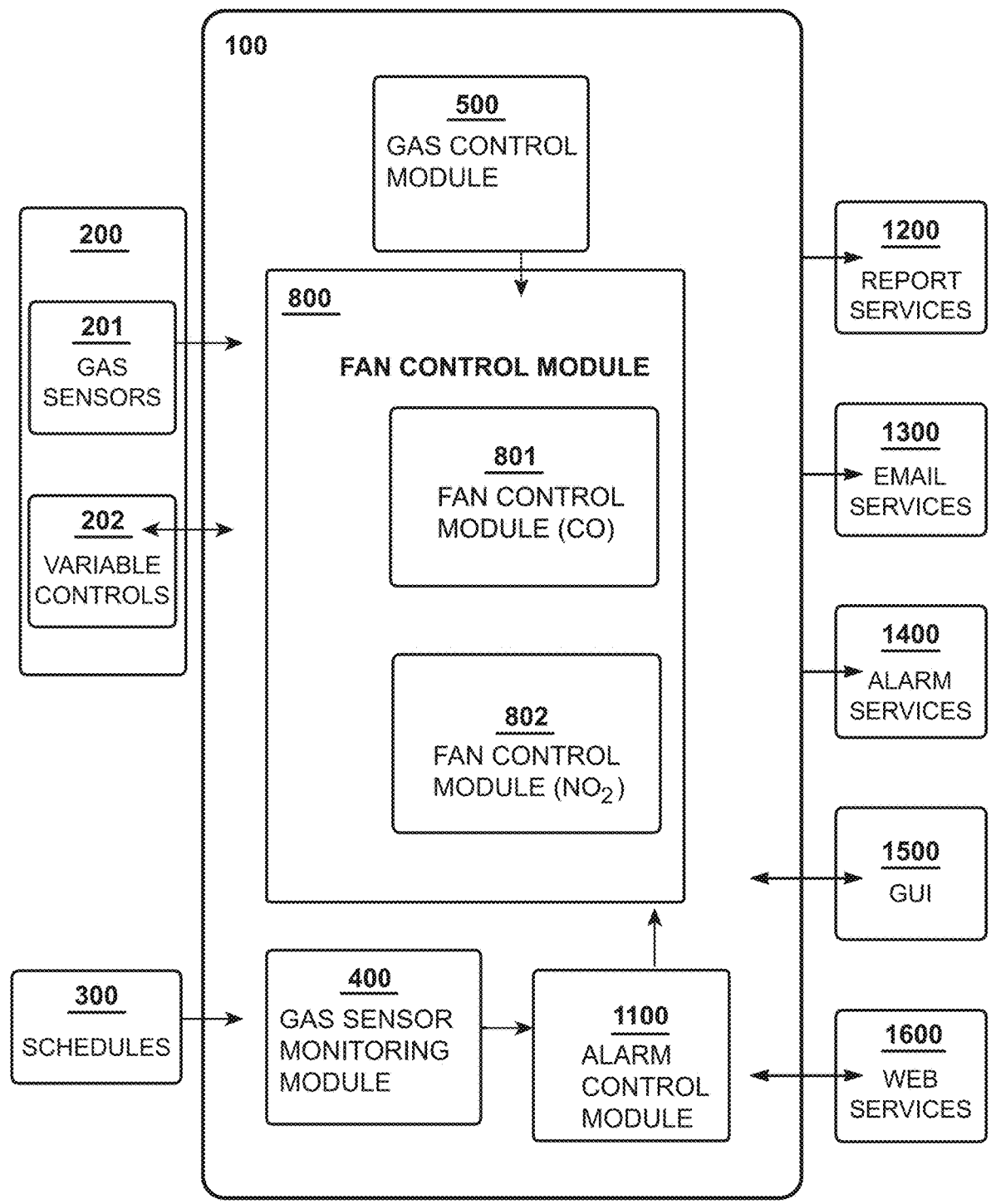
Figure 19:
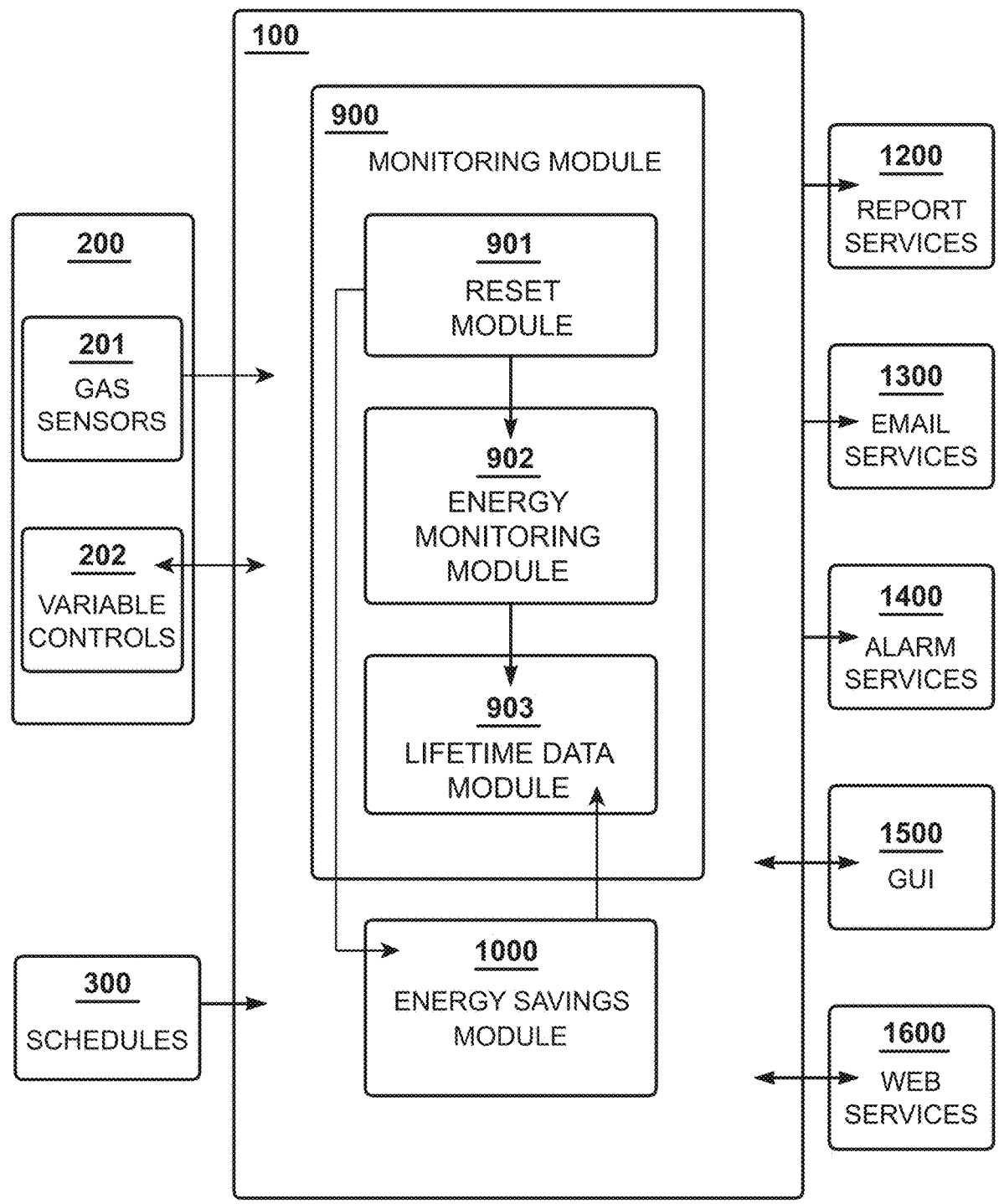
Figure 20:
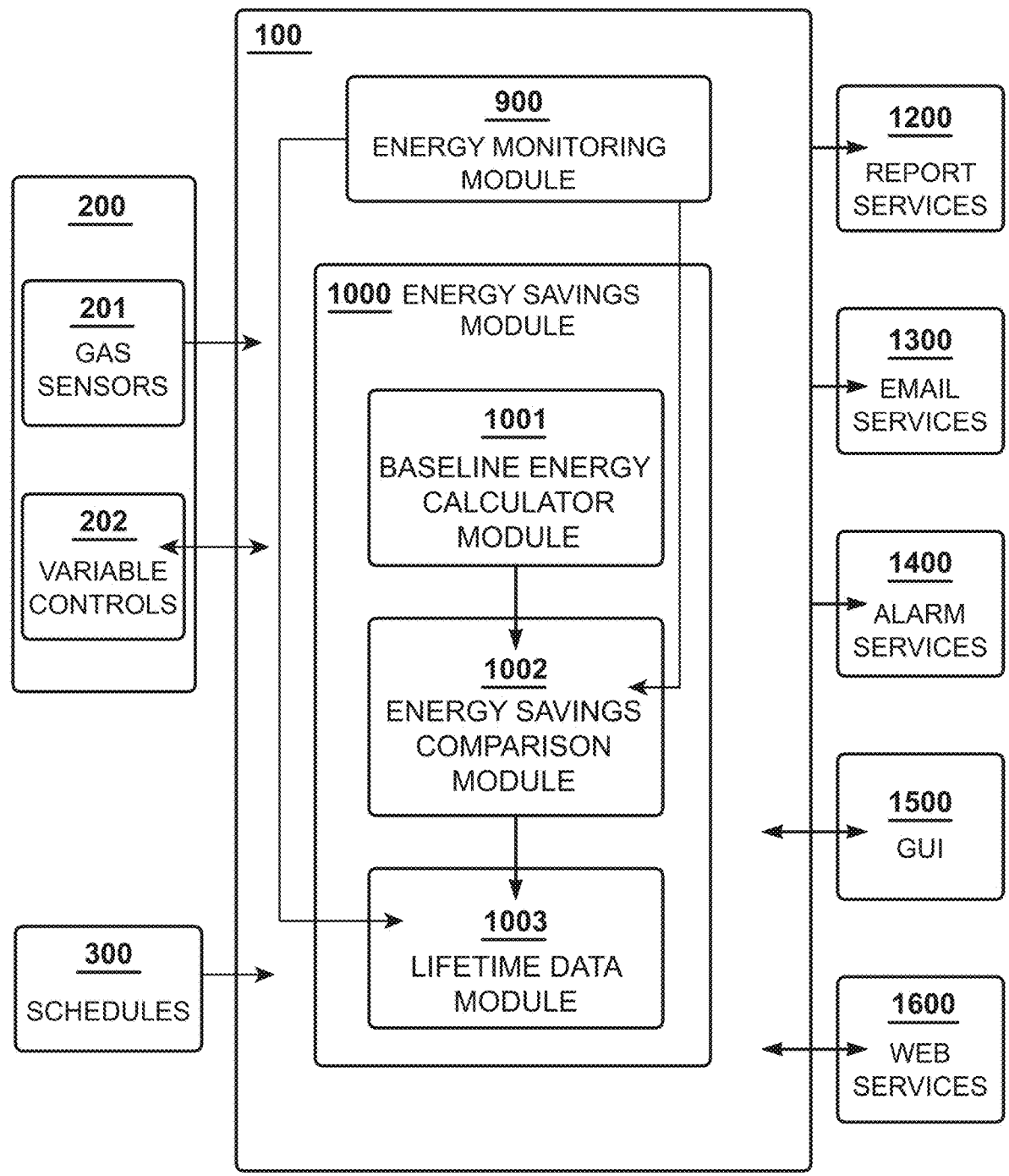
Figure 21:
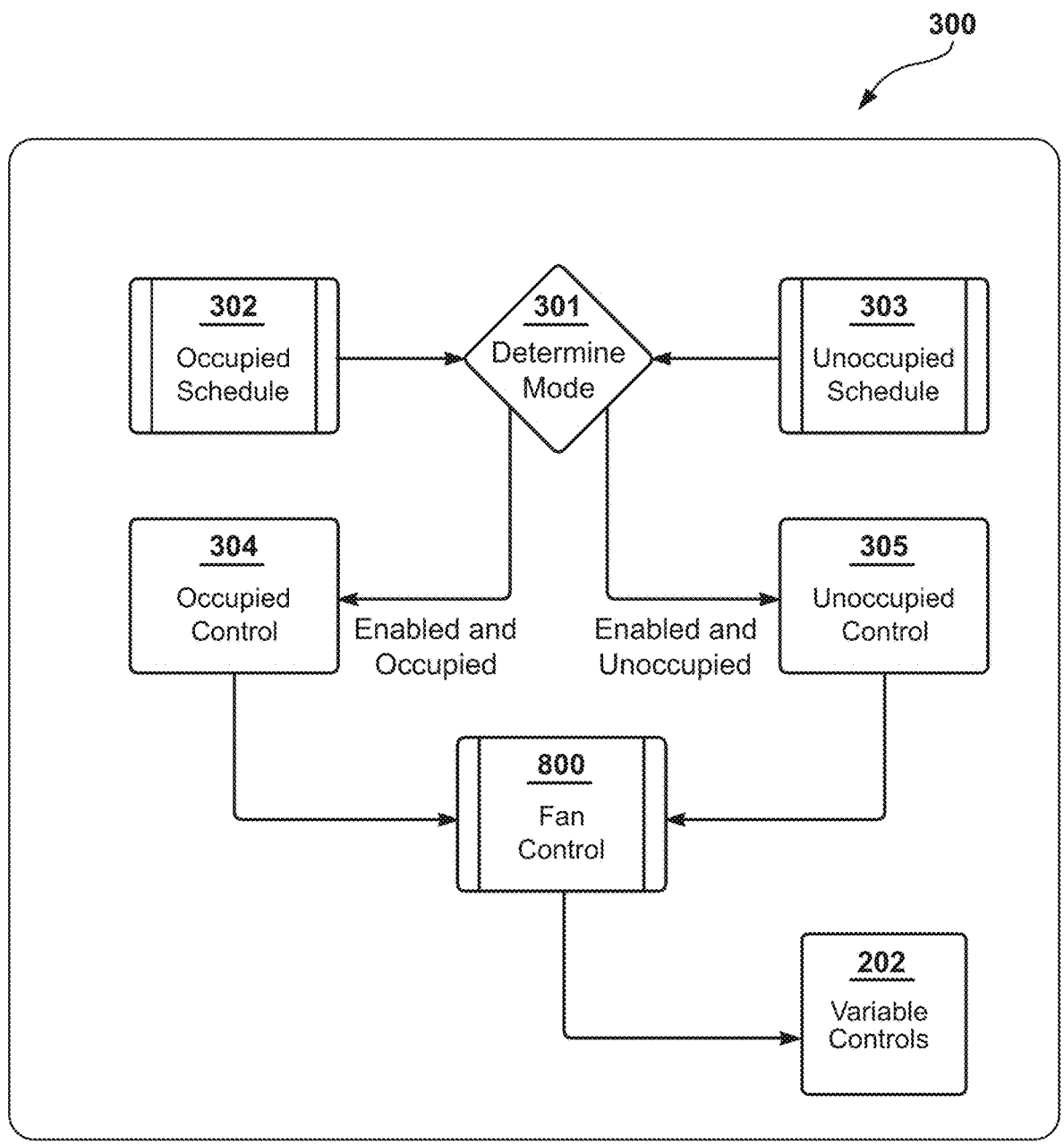

Next, CO emission rates is estimated by applying a correction factor that varies based on soak time. Using data from CARE, which provides a relationship between normalized CO emission rates versus soak times for relatively recent vehicles equipped with catalytic convertors, as shown in FIG. 16. Note that a value of 1 in the vertical axis of FIG. 16 refers to a full overnight soak.

Based on the CO emission correction factors depicted in FIG. 16, the results of FIG. 15 can be converted to estimates of the CO emission rate for vehicles in Parking Garage 2 based on their soak time distributions, as shown in Table 10.

TABLE 10

Average CO emission correction factor for Parking Garage 2

| Average correction factor | Percentage of vehicles (%) |
|---|---|
| 0-1 | 0.30 |
| 1-2 | 0.66 |
| 2-3 | 0.75 |
| 3-4 | 0.78 |

A weighted correction factor for the CO emission rate in the first 4 hours of soak times (i.e., 85% of cars with warm start) can be calculated as follows:

Weighted correction factor(warm start)=0.22×0.3+ 0.33×0.66+0.23×0.75+0.095×0.78=0.5

Finally, the average cold start and warm start CO emission rates for vehicles in the garage at the average ambient conditions for the city where the garages are located is estimated as follows:

$$\text{Average CO emission rate (cold start)} = 4.7 \frac{g}{\min}$$

for 15% of vehicles $$\text{Average CO emission rate (warm start)} = 0.5 \times 4.7 = 2.35 \frac{g}{\min}$$

for 85% of vehicles

Having established all the foundational scientific principles and other assumptions to reasonably present the energy savings strategy and its comparative result to other methods, the discussion now moves to the direct comparison of the energy savings between the preferred embodiment and other energy savings models.

Table A summarizes the annual energy consumption estimated under the four cases of engine start and vehicle occupancy assumptions with the existing makes and models of fans used (i.e., Greenheck 49-USF-400 AF and Greenheck 30-USF-300 BI). Table B summarizes the energy savings predicted for the preferred embodiment control strategy compared to the three baseline control strategies under the same sets of assumptions.

TABLE A

Annual fan energy consumption predicted for two parking garage and two assumed engine start conditions

| | Estimated total energy consumption (kWh) | | | |
|---|---|---|---|---|
| Control strategy | Garage 1 with majority warm start conditions | Garage 2 with majority warm start conditions | Garage 1 with majority cold start conditions | Garage 2 with majority cold start conditions |
| Preferred Embodiment | 5,028 | 6,387 | 5,114 | 6,769 |
| SVF | 32,734 | 41,208 | 32,734 | 41,208 |
| On-Off | 15,809 | 22,808 | 20,032 | 28,923 |
| Always-On | 248,569 | 312,916 | 248,569 | 312,916 |

TABLE B

Annual fan energy savings predicted for two parking garage and two assumed engine start conditions

| Preferred Embodiment Energy Savings compared to other control strategy | Estimated total energy savings (%) | | | |
|---|---|---|---|---|
| | Garage 1 with warm start conditions | Garage 2 with warm start conditions | Garage 1 with cold start conditions | Garage 2 with cold start conditions |
| Against SVF | 84.64% | 84.50% | 84.38% | 83.57% |
| Against On-Off | 68.19% | 72.00% | 74.47% | 76.60% |
| Against Always On | 97.98% | 97.96% | 97.94% | 97.84% |

The results show that the preferred embodiment substantially outperforms all other control strategies on the basis of annual energy consumption. Using model inputs for existing Greenheck fans, the preferred embodiment strategy saves an average (±standard deviation) across the four scenarios of ~97.9±0.1% compared to the Always On strategy. The low standard deviation demonstrates that the parking garage occupancy and cold start conditions have little influence on the energy savings achievable by the preferred embodiment control strategy compared to the Always On strategy.

The preferred embodiment strategy is also estimated to save an average (±standard deviation) across the four scenarios of ~85.3±2.3% compared to the SVF strategy, and ~72.8±3.6% compared to the On-Off strategy.

In addition to annual energy savings, it is also crucial to estimate the impact of each control strategy on peak electric power draw, which will influence the costs of peak demand charges from electric utilities depending on the geographic location, utility company, and the utility purchase structure (e.g., demand-response, time of use, and block purchase). Often a high spike even for a few minutes will result in a high peak demand charge.

Tables C through F show results for the predicted peak power draw using the four control strategies under the four main assumptions of two parking garages and two engine start conditions assuming the existing Greenheck fans. Results include the estimated peak fan power demand as well as the duration of that demand throughout the year. The preferred embodiment has a much lower peak power demand than all other strategies because of its low baseline fan speed and linear response to CO concentrations that yields only moderate increases fan speed and thus power draw. The average (±standard deviation) reductions in peak power draw across all four modeled conditions are predicted to be ~78.2±5.1%, ~97.1±0.7%, and ~97.1±0.7% for the preferred embodiment compares to the SVF, On-Off, and Always-On strategies, respectively. Note that the preferred embodiment yields two "peak" values since during the ramp-up stage, the actual fan power draw varies based on the linear response to CO concentrations.

TABLE C

Estimated maximum peak demand and duration predicted for Parking Garage 1 with warm start conditions

| Preferred Embodiment | | SVF | | On-Off | | Always-On | |
|---|---|---|---|---|---|---|---|
| Duration (Mins) | Demand (kW) | Duration (Minutes) | Demand (kW) | Duration (Minutes) | Demand (kW) | Duration (Minutes) | Demand (kW) |
| 52 | 0.9 | 7,073 | 5.34 | 427 | 40.55 | 7,073 | 40.55 |
| 7,021 | 0.82 | 3,008 | 0 | 9,654 | 0 | 3,008 | 0 |
| 3,008 | 0 | n/a | n/a | n/a | n/a | n/a | n/a |

TABLE D

Estimated maximum peak demand and duration predicted for Parking Garage 2 with warm start conditions

| Preferred Embodiment | | SVF | | On-Off | | Always-On | |
|---|---|---|---|---|---|---|---|
| Duration (Minutes) | Demand (kW) | Duration (Minutes) | Demand (kW) | Duration (Minutes) | Demand (kW) | Duration (Minutes) | Demand (kW) |
| 397 | 0.97 | 8,904 | 5.34 | 649 | 40.55 | 8,904 | 40.55 |
| 8,447 | 0.82 | 1,177 | 0 | 9,432 | 0 | 1,177 | 0 |
| 1,177 | 0 | n/a | n/a | n/a | n/a | n/a | n/a |

TABLE E

Estimated maximum peak demand and duration predicted for Parking Garage 1 with cold start conditions

| Preferred Embodiment | | SVF | | On-Off | | Always-On | |
|---|---|---|---|---|---|---|---|
| Duration (Minutes) | Demand (kW) | Duration (Minutes) | Demand (kW) | Duration (Minutes) | Demand (kW) | Duration (Minutes) | Demand (kW) |
| 476 | 1.32 | 7,073 | 5.34 | 570 | 40.55 | 7,073 | 40.55 |
| 6,599 | 0.82 | 3,008 | 0 | 9,511 | 0 | 3,008 | 0 |
| 3,006 | 0 | n/a | n/a | n/a | n/a | n/a | n/a |

TABLE F

Estimated maximum peak demand and duration predicted for Parking Garage 2 with cold start conditions

| Preferred Embodiment | | SVF | | On-Off | | Always-On | |
|---|---|---|---|---|---|---|---|
| Duration (Minutes) | Demand (kW) | Duration (Minutes) | Demand (kW) | Duration (Minutes) | Demand (kW) | Duration (Minutes) | Demand (kW) |
| 1,556 | 1.47 | 8,904 | 5.34 | 823 | 40.55 | 8,904 | 40.55 |
| 7,348 | 0.82 | 1,177 | 0 | 9,258 | 0 | 1,177 | 0 |
| 1,177 | 0 | n/a | n/a | n/a | n/a | n/a | n/a |

Finally, Table G also shows the estimated energy savings achievable by the preferred embodiment control strategy compared to the three baseline control strategies assuming another common fan type—axial fans—is used instead of centrifugal fans. Greenheck VAD-20H-14 fans are assumed to be used in this case, as described previously in the fans section.

The results are similar to the existing centrifugal fans. The preferred embodiment typically yields average (±standard deviation) annual energy savings of ~73.6±4.2%, ~80.2±0.6%, and ~98.3±0.1% compared to the SVF, On-Off, and Always-On control strategies across the four different model scenarios.

TABLE G

Estimated energy savings for alternative axial fans

| Savings compared to control strategy | Estimated total energy savings (%) | | | |
|---|---|---|---|---|
| | Garage 1 with warm start conditions | Garage 2 with warm start conditions | Garage 1 with cold start conditions | Garage 2 with cold start conditions |
| Against SVF | 80.66% | 80.49% | 80.33% | 79.32% |
| Against On-Off | 67.96% | 73.23% | 75.59% | 77.62% |
| Against vs. Always On | 98.34% | 98.33% | 98.31% | 98.23% |

As seen in the discussion above, the preferred embodiment has been shown through simulation and empirical data to save electric energy compared to other strategies such as SVF, On-Off, and Always-On approaches. The savings are driven primarily by the known cubic relationship between fan power draw and fan speed, whereby fans operating at lower speeds will draw much less power than operating at higher speeds, taking advantage of the highly non-linear relationship. At the same time, CONTAM simulations data both demonstrate that under most conditions, the preferred embodiment approach increases fan speed rapidly enough to keep gas concentrations below defined threshold values.

While the preferred embodiment approach clearly saves energy compared to other common alternatives, there may be additional savings achievable through more optimal enhancements to the preferred embodiment approach while still keeping gas concentrations below defined limits, depending on the nature of emission sources and resulting concentrations in the space.

For example, the following factors influence the energy savings potential of the preferred embodiment approach:

a) Changing the shape of the response function between fan speed and gas concentration (e.g., supra-linear or sub-linear):

i) An example of a supra-linear response would be as follows:
  (1) Setting base fan speed at 25% up to the minimum gas concentration value;
  (2) From 10 ppm to 35 ppm CO, increase fan speed as a supra-linear exponential function (i.e., multiplying the base rate by $[e^{x(\Delta C)}]$ where x=a constant and $\Delta C$=the excess particular gas concentration above the minimum gas concentration value);
  (3) Set maximum fan speed at 100% above the maximum gas concentration value;
ii) An example of a sublinear response would be as follows:

(1) Set base fan speed at 25% up to minimum gas concentration value;
(2) From 10 ppm to 35 ppm CO, increase fan speed as a sub-linear exponential function (i.e., multiplying the base rate by $[2+e^{-x(\Delta C)}]$ where x=a constant and $\Delta C$=the excess gas concentration above the minimum gas concentration value);
(3) Set maximum fan speed at 100% above maximum gas concentration value;

b) Reducing the baseline fan speed further:
  i) The baseline fan speed can be varied per garage to the level that meets constant ventilation requirements in ASHRAE Standard 62.1 (i.e., 0.15 cfm/ft$^2$). For the preferred embodiment, the minimum ventilation rate set with the preferred embodiment strategy (i.e., 25% fan speed) is 0.187 cfm/ft$^2$, which is slightly higher than the code requirement. This suggests that a further improvement to the preferred embodiment could be to consider a baseline speed lower than 25% as long as the minimum ventilation rate still meets the local code requirements.

c) Using a different minimum gas concentration value at which the control process is engaged;
  i) The minimum particular gas concentration value could vary slightly depending on local requirements (For example, the United States Environmental Protection Agency sets outdoor maximum CO levels at 35 ppm for 1-hour average. Typical occupational limits are often much higher, such that a higher particular gas concentration value may yield further energy savings)

d) Considering different response functions during periods when the majority of cars are either entering (i.e., mornings) or exiting (i.e., evenings) to account for the impact of varying gas emissions from hot and cold engine starts.

e) Further lowering the ventilation rate as close as possible to ASHRAE 62.1 minimum requirements in the morning time when the cars enter the garage and their CO emission rate is lower than they will be during the exit time periods.

The implementation of the preferred embodiment strategy is achieved through writing a customized software module that can be layered on top of a standard building management system (BMS) architecture and protocols. A BMS also is known as a Building Automation System (BAS).

A BMS is a computer-based system that monitors and controls building mechanical and electrical equipment such as ventilation, lighting, power systems, fire systems, and security systems. A BMS consists of software and hardware. Software programming is usually configured in a hierarchical manner and may be proprietary. It further integrates the use of Internet protocols and open communication standards such as BACnet®, Modbus®, Metasys® and LonWorks® and others.

Specifically, BMS programming language can be implemented using Building Automation and Control (BAC) hardware and software network communication protocols such as BACnet, which are compliant with, and leverage, the ASHRAE, ANSI, and ISO 16484-5 protocol standards. The preferred embodiment's control strategy can be written as a custom code on top of existing BMS/BAS programming modules. For example, the Niagara programming framework is a universal software infrastructure which allows organizations to easily build custom, web-enabled applications for accessing, automating, and controlling "smart" devices in real-time. The Niagara framework is capable of employing a number of available and commonly used programming protocols to communicate with the applicable BMS and/or EMS programming modules, e.g., BACnet. Java Application Control Engine (JACE) is used as a mechanism/device that provides connectivity to systems within a building via the Niagara framework.

The preferred embodiment strategy is designed such that instantaneous feedback is provided to a controller from digital-communicating gas sensors deployed in designated ventilation zone throughout an enclosed garage. The controller then relays speed commands via means of a variable control device to the primary exhaust and supply fan motor units and secondary fan motor units designed to provide ventilation in enclosed parking garages.

Looking at FIGS. 17 through 21, diagrams of an example of the preferred embodiment of the Garage Ventilation Control Logic 100 are provided. The garage ventilation control logic 100 is a set of custom programming modules that can be placed on any application-specific controller platform such as the Java Application Control Engine (JACE) or similar market equivalents. The garage ventilation control logic 100 is connected to a collection of devices in the field network 200 that include gas sensors 201 and variable control devices 202 that communicate to the garage ventilation control logic 100 via RS-485, HTTPS or other communication protocol. The garage ventilation control logic 100 utilizes the scheduling function 300 typically available in the application specific controller platform to create user-defined parameters that allow it to engage specific fan-motor behaviors based on predetermined time events. The garage ventilation control logic also is connected to other standard output functions already available in the application-specific controller platform, including but not limited to report services 1200, email output services 1300, alarm and notification services 1400, standard input/output interface through GUI 1500, and web-based interface and control services 1600.

In the preferred embodiment, the garage ventilation control logic 100 comprises several other modules, including but not limited to gas sensor monitoring modules 400, gas control modules 500, fan control module 800, energy monitoring module 900, energy savings module 1000, and alarm control module 1100. It should be understood that other modules may be added or removed from the garage ventilation control logic 100 based on the specific needs of the garage ventilation control logic.

The schedule function 300 has a logical mode determination function 301 that can determine different energy saving schemes for different times of the day. For an example, a parking garage can set two different energy savings schedule, i.e. during occupied times 302 and unoccupied times 303. Occupied schedule 302 refers to hours when the parking garage is open for access, and therefore gas concentration levels are expected to be higher. In contrast, unoccupied schedule refers to hours when the parking garage is closed, and therefore there is no or very minimal activity (maintenance, service) in the garage, such that gas concentration levels should be minimal. The schedule function 300 determines the type of schedule depending the time of the day using the mode determination logic 301, and sends to fan control the appropriate control settings (i.e. occupied settings 304 during occupied schedule 302, and unoccupied settings 305 during unoccupied schedule 303).

The Gas Sensor Module 400 contains submodules that monitor different types of gases, including a CO gas sensor monitoring module 410 and $NO_2$ gas sensor monitoring module 420. It should be understood that the modules are customizable such that different gas types can be added to the modules as needed. For the purposes of this detailed description, it is assumed that other gas types can be added to the modules and perform similarly to the CO and $NO_2$ modules described herein.

The Gas sensor modules 400 monitors the connected gas sensors by receiving gas concentration values from the plurality of gas sensors 201 connected through the network and installed in the garage structure. The gas sensor modules 400 also keep track of the operation of the gas sensors 201 and triggers the alarm control module 1100 when detecting anomalous sensor behavior. Anomalous sensor behavior includes but is not limited to (1) situations where one or more sensors return values outside of the accepted average value of other sensors in its zone, implying unusual gas readings or malfunctioning sensors, or (2) no communications detected between the sensors and the module. The sensor modules also can be programmed to send a notification/alarm for predetermined events such as maintenance events, including sensor replacement and calibration events.

The gas control module 500 contains the high average function modules for different gases, such as the high average function module for CO 510 and the high average function module for NO2 520. The high average function module performs the high average function calculation previously described above, producing a high-average gas concentration value for each gas type at a certain time interval. The high-average gas concentration value is then passed from the gas control modules 500 to the fan control module 800 and alarm control module 1100.

The fan control module 800 contains specific modules for each gas type, one for CO 801 and another for $NO_2$ 802. The fan control modules control the fan motor speed based on the predetermined energy savings strategy previously described above. On a technical level, the fan control module sends instructions to the variable control devices 202, which in turn adjust the speed of fan motor units according to energy savings control strategy for each additional measured increment value unit above the minimum particular gas concentration value.

The energy monitoring module 900 contains the monitoring module 902, which receives energy consumption values from the variable controls 202 connected to the fan motor units. The lifetime data module 903 compiles all energy usage data and cost savings to date and outputs the data into a chart or report that a user can review. The reset module 901 sends a reset command to monitoring module 902 and energy savings module 1000 to initialize a new set of values for the compilation of new weekly, monthly, and annual energy savings reports calculated by the monitoring module 902 and energy savings module 1000.

The energy calculator module 1000 receives input(s)—in the form of energy usage measured in kWh and cost—from the Energy Monitoring Module 900 and calculates the delta between the amounts of energy consumed and the baseline energy usage from the Baseline Energy Calculator Module 1001. The baseline energy calculator module 1001 receives input(s)—in the form of run status from the variable control devices—and then calculates the kWh and cost based on the fan motors running at 100 percent of motor-speed capacity. The Energy Savings Comparison Module 1002 calculates the delta between actual energy consumption and cost and the energy consumption and cost based on the motors running at 100 percent capacity. The lifetime data module 1003 shows the lifetime energy usage and costs associated with the Energy Monitoring Module 900 and the Energy Savings Comparison Module 1002.

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and whose upper limit is the second number. For example, 25 to 100 mm means a range whose lower limit is 25 mm, and whose upper limit is 100 mm.

Although the present invention has been described in considerable detail with reference to certain preferred versions thereof, other versions are possible. Therefore, the spirit and scope of the appended claims should not be limited to the description of the preferred version contained herein.

What is claimed is:

1. A method performed by a building automation control system to predict, optimize, record, and display energy savings in continuous operation of exhaust and supply fan motor units providing ventilation in an enclosed parking garage, comprising:
   a. defining a specific area in said enclosed parking garage as a gas measurement zone;
   b. defining a predetermined gas measurement time, and dividing said gas measurement time into equal time intervals;
   c. setting a base fan motor speed at a minimum base speed;
   d. setting a minimum gas concentration value;
   e. setting a maximum gas concentration value;
   f. receiving input data in the form of a gas concentration value from a plurality of gas sensors located in said gas measurement zone at each time interval;

g. calculating average gas concentration values based on the input data of each of said gas concentration values received from the plurality of gas sensors located in said measurement zone at each time interval;
h. comparing successive average gas concentration values calculated at each time interval;
i. setting a highest value of said average gas concentration values as a high-average gas concentration value;
j. comparing the minimum gas concentration value with the high-average gas concentration value;
k. maintaining the fan motor speed at the minimum base speed when the high-average gas concentration value is less than or equal to the minimum gas concentration value;
l. adjusting fan motor speed from minimum base speed by increasing fan motor speed a predetermined percent increment value in accord with a predetermined exponential non-linear function for every additional measured increment of the high-average gas concentration value above the minimum gas concentration value until the high-average gas concentration value reaches the maximum gas concentration value;
m. operating said fan-motor units at a constant speed of 100 percent of full-motor capacity when the high-average gas concentration value is equal to or greater than the maximum gas concentration value;
n. calculating and predicting energy savings of the system as operated in accord with the prior steps upon implementation of the method, the predicted energy savings taking into account and correcting for predicted vehicles mixes for warm and cold start conditions, predicted length of time taken to exit the garage and predicted ambient temperature;
o. measuring and storing a record of actual energy use during a selected energy monitoring time frame wherein the method has been operating and responding to real-time gas concentrations and actual vehicle mixes for warm and cold start conditions; and,
p. displaying actual energy savings of the overall system when responding to actual measured gas concentrations and vehicles mixes for warm and cold start conditions and ambient temperature as compared to previously predicted energy savings based on (1) timing and quantity of occupancy patterns of vehicles entering and exiting the garage, (2) per-vehicle CO emission rates of vehicles entering and exiting the garage, and (3) the types of fans used.

2. The method of claim 1, wherein the predetermined gas measurement time is set at a value between 60 seconds and 180 seconds.

3. The method of claim 1, wherein the gas is Carbon monoxide (CO).

4. The method of claim 1, wherein the gas is Nitrogen dioxide ($NO_2$).

5. The method of claim 1, wherein the minimum base speed of the fan-motor unit is set in a range between 14% and 38% of fan-motor unit full capacity.

6. The method of claim 1, wherein the minimum base speed of the fan-motor unit is set at 0.0 percent of the fan-motor unit full capacity.

7. The method of claim 1, wherein the minimum gas concentration value is set at a value between 4.0 ppm and 24.0 ppm for CO.

8. The method of claim 1, wherein the minimum gas concentration value is set at a value between 0.0 ppm and 5.0 ppm for $NO_2$.

9. The method of claim 1, wherein the maximum gas concentration value is set at a value between 25.0 ppm and 45.0 ppm for CO.

10. The method of claim 1, wherein the maximum gas concentration value is set at a value between 5.0 ppm and 10.0 ppm for $NO_2$.

11. The method of claim 1, wherein the measured increment is set at a value between 0.5 ppm and 1.5 ppm for CO.

12. The method of claim 1, wherein the measured increment is set at a value between 0.05 ppm and 0.50 ppm for $NO_2$.

13. The method of claim 1, wherein the predetermined percent increment value is set at a value between 1.0 percent and 8.5 percent.

14. A method performed by a building automation control system to predict and optimize energy savings in continuous operation of fan motor units designed to provide ventilation in an enclosed parking garage, comprising:
a. defining specific areas in said enclosed parking garage as gas measurement zones;
b. defining a predetermined gas measurement time and dividing said measurement time into equal time intervals;
c. setting a base fan ventilation rate at a minimum base ventilation rate;
d. setting a minimum gas concentration value;
e. setting a maximum gas concentration value;
f. receiving input data in the form of a gas concentration value from each of a plurality of gas sensors located in each of said measurement zones at each time interval;
g. calculating average gas concentration values from each of said gas concentration values received from the plurality of gas sensors located in said gas measurement zones at each time interval;
h. comparing successive average gas concentration values calculated at each time interval;
i. setting a highest value of said average gas concentration values as a high-average gas concentration value;
j. comparing the minimum gas concentration value with the high-average gas concentration value;
k. maintaining the fan ventilation rate at the minimum base speed when the high-average concentration value is less than or equal to the minimum gas concentration value;
l. adjusting the ventilation rate from its minimum ventilation rate value by increasing the ventilation rate value at a predetermined ventilation rate increment value in accord with either a supra-linear or sub-linear exponential function for every additional measured increment value of high-average gas concentration value above the minimum gas concentration value until the high-average gas concentration value reaches the maximum gas concentration value;
m. operating said fan-motor units at maximum ventilation rate capacity when the high-average gas concentration value is equal or greater than the maximum gas concentration value;
n. calculating and predicting energy savings of the system as operated in accord with the prior steps upon implementation of the method, the predicted energy savings taking into account and correcting for predicted vehicles mixes for warm and cold start conditions, predicted length of time taken to exit the garage and predicted ambient temperature;
o. measuring and storing a record of actual energy use during a selected energy monitoring time frame wherein the method has been operating and responding to real-time gas concentrations and actual vehicle mixes for warm and cold start conditions; and, p. displaying actual energy savings of the overall system when responding to actual measured gas concentrations and vehicles mixes for warm and cold start conditions and ambient temperature as compared to previously predicted energy savings based on (1) timing and quantity of occupancy patterns of vehicles entering and exiting the garage, (2) per-vehicle CO emission rates of vehicles entering and exiting the garage, and (3) types of fans used.

15. The method of claim 14, wherein the predetermined measurement time is set at a value between 60 seconds and 180 seconds.

16. The method of claim 14, wherein the gas is Carbon monoxide (CO).

17. The method of claim 14, wherein the gas is Nitrogen dioxide ($NO_2$).

18. The method of claim 14, wherein the minimum base ventilation rate is set between 0.100 cfm/ft$^2$ and 0.250 cfm/ft$^2$.

19. The method of claim 14, wherein the minimum ventilation rate of the fan-motor unit is set at a ventilation rate value of 0.000 cfm/ft$^2$.

20. The method of claim 14, wherein the minimum gas concentration value is set at a value between 4.0 ppm and 24.0 ppm for CO.

21. The method of claim 14, wherein the minimum gas concentration value is set at a value between 0.0 ppm and 5.0 ppm for $NO_2$.

22. The method of claim 14, wherein the maximum gas concentration value is set at a value between 25.0 ppm and 45.0 ppm for CO.

23. The method of claim 14, wherein the maximum gas concentration value is set at a value between 5.0 ppm and 10.0 ppm for $NO_2$.

24. The method of claim 14, wherein the measured increment value is set at a value between 0.5 ppm to 1.5 ppm for CO.

25. The method of claim 14, wherein the measured increment value is set at a value between 0.05 ppm to 0.50 ppm for $NO_2$.

26. The method of claim 14, wherein the predetermined ventilation increment rate is set at a value between 0.006 cfm/ft$^2$ and 0.050 cfm/ft$^2$.

27. A control system, for controlling ventilation apparatus including fan motor units in an enclosed space so as to predict and optimize energy savings for said ventilation apparatus, comprising:

a plurality of gas concentration measuring sensor devices located in specific gas measurement zones in said enclosed space;

a predetermined measurement timing device capable of dividing a measurement time into equal intervals;

a fan motor speed controller for setting base fan motor speed at a minimum base speed value;

a controller for setting minimum and maximum gas concentration values taking into account predicted occupancy and use of said enclosed space; said controller receiving input data of a gas concentration value from said plurality of gas concentration sensors located in each measurement zone at each time interval and calculating average gas concentration values of the input data of said gas concentration values received from the plurality of gas sensors located in said gas measurement zone at each time interval; comparing successive average gas concentration values calculated at each time interval; setting the highest value of said average gas concentration values as a high-average gas concentration value; comparing the minimum gas concentration value with the high-average gas concentration value; maintaining the fan motor speed at its minimum base speed value when the high-average concentration value is less than or equal to the minimum gas concentration value; adjusting the fan speed from its minimum base speed value by increasing the fan motor speed at a specific increment in accord with either a supra-linear or sub-linear exponential function for every additional 1 ppm of high-average gas concentration value above the minimum gas concentration value until the high-average gas concentration value reaches the maximum gas concentration value; and, operating said fan-motor units at a constant speed of 100% of full-motor capacity when the high-average gas concentration value is equal or greater than the maximum gas concentration threshold value, said controller further calculating and predicting energy savings of the system as operated by said controller upon implementation and use of the control system, the predicted energy savings taking into account and correcting for predicted vehicles mixes for warm and cold start conditions, predicted length of time taken to exit the garage and predicted ambient temperature; measuring and storing a record of actual energy use during a selected energy monitoring time frame wherein the method has been operating and responding to real-time gas concentrations and actual vehicle mixes for warm and cold start conditions; and, displaying on a display actual energy savings of the overall system when responding to actual measured gas concentrations and vehicles mixes for warm and cold start conditions and ambient temperature as compared to predicted energy savings based on (1) timing and quantity of occupancy patterns of vehicles entering and exiting the garage, (2) per-vehicle CO emission rates of vehicles entering and exiting the garage, and (3) types of fans used.

28. A system as in claim 27, wherein the predetermined measurement time is set at 120 seconds.

29. A system as in claim 27, wherein the gas is Carbon monoxide (CO).

30. A system as in claim 27, wherein the gas is Nitrogen dioxide ($NO_2$).

31. A system as in claim 27, wherein the minimum base speed value of the fan-motor unit is set in the range between 14% and 38% of the fan-motor unit full capacity.

32. A system as in claim 27, wherein the minimum base speed value of the fan-motor unit is set at zero percent of the fan-motor unit full capacity.

33. A system as in claim 27, wherein the minimum gas concentration value is set at a value between 4.0 ppm and 24.0 ppm for CO.

34. A system as in claim 27, wherein the minimum gas concentration value is set at a value between 0.0 ppm and 5.0 ppm for $NO_2$.

35. A system as in claim 27, wherein the maximum gas concentration value is set at value between 25.0 ppm and 45.0 ppm for CO.

36. A system as in claim 27, wherein the maximum gas concentration value is set at a value between 5.0 ppm and 10.0 ppm for $NO_2$.

37. A system as in claim 27, wherein a measured increment value is set at a value between 0.5 ppm to 1.5 ppm for CO.

38. A system as in claim 27, wherein a measured increment value is set at a value between 0.05 ppm to 0.50 ppm for $NO_2$.

39. A system as in claim 27, wherein the specific increment value is set at a value between 1.0 percent and 8.5 percent.

40. A system controller, employed in building automation control, storing instructions that are executable to perform operations to predict, optimize, record, and display energy savings in continuous operation of exhaust and supply fan motor units providing ventilation in an enclosed parking garage, comprising:
   a. defining a specific area in said enclosed parking garage as a gas measurement zone;
   b. defining a predetermined gas measurement time, and dividing said gas measurement time into equal time intervals;
   c. setting a base fan motor speed at a minimum base speed;
   d. setting a minimum gas concentration value;
   e. setting a maximum gas concentration value;
   f. receiving input data in the form of a gas concentration value from a plurality of gas sensors located in said gas measurement zone at each time interval;
   g. calculating average gas concentration values based on the input data of each of said gas concentration values received from the plurality of gas sensors located in said measurement zone at each time interval;
   h. comparing successive average gas concentration values calculated at each time interval;
   i. setting a highest value of said average gas concentration values as a high-average gas concentration value;
   j. comparing the minimum gas concentration value with the high-average gas concentration value;
   k. maintaining the fan motor speed at the minimum base speed when the high-average gas concentration value is less than or equal to the minimum gas concentration value;
   l. adjusting fan motor speed from minimum base speed by increasing fan motor speed a predetermined percent increment value in accord with a predetermined exponential non-linear function for every additional measured increment of the high-average gas concentration value above the minimum gas concentration value until the high-average gas concentration value reaches the maximum gas concentration value;
   m. operating said fan-motor units at a constant speed of 100 percent of full-motor capacity when the high-average gas concentration value is equal to or greater than the maximum gas concentration value;
   n. calculating and predicting energy savings of the system as operated in accord with the prior steps upon implementation of the method, the predicted energy savings taking into account and correcting for predicted vehicles mixes for warm and cold start conditions, predicted length of time taken to exit the garage and predicted ambient temperature;
   o. measuring and storing a record of actual energy use during a selected energy monitoring time frame wherein the method has been operating and responding to real-time gas concentrations and actual vehicle mixes for warm and cold start conditions; and,
   p. displaying actual energy savings of the overall system when responding to actual measured gas concentrations and vehicles mixes for warm and cold start conditions and ambient temperature as compared to previously predicted energy savings based on (1) timing and quantity of occupancy patterns of vehicles entering and exiting the garage, (2) per-vehicle CO emission rates of vehicles entering and exiting the garage, and (3) types of fans used.

41. A system controller as in claim 40, wherein the predetermined measurement time is set at a value between 60 seconds and 180 seconds.

42. A system controller as in claim 40, wherein the gas is Carbon monoxide (CO).

43. A system controller as in claim 40, wherein the gas is Nitrogen dioxide ($NO_2$).

44. A system controller as in claim 40, wherein the minimum base ventilation rate value is set at a value between 0.100 $cfm/ft^2$ and 0.250 $cfm/ft^2$.

45. A system controller as in claim 40, wherein the minimum base speed value of the fan-motor unit is set at a ventilation rate value of 0.000 cfm/ft2.

46. A system controller as in claim 40, wherein the minimum gas concentration value is set at a value between 4.0 ppm and 24.0 ppm for CO.

47. A system controller as in claim 40, wherein the minimum gas concentration value is set at a value between 0.0 ppm and 5.0 ppm for $NO_2$.

48. A system controller as in claim 40, wherein the maximum gas concentration value is set at value between 25.0 ppm and 45.0 ppm for CO.

49. A system controller as in claim 40, wherein the maximum gas concentration value is set at a value between 5.0 ppm and 10.0 ppm for $NO_2$.

50. A system controller as in claim 40, wherein the measured increment value is set at a value between 0.5 ppm to 1.5 ppm for CO.

51. A system controller as in claim 40, wherein the measured increment value is set at a value between 0.05 ppm to 0.50 ppm for $NO_2$.

52. A system controller as in claim 40, wherein the predetermined increment is set at a value between 0.006 $cfm/ft^2$ to 0.050 $cfm/ft^2$.

53. A method as in claim 1, wherein
said fan motor units further comprise secondary fan motor units.

54. A method as in claim 14, wherein
said fan motor units comprise primary exhaust and supply fan motor units and secondary fan motor units.

55. A system as in claim 27, wherein
said fan motor units comprise primary exhaust and supply fan motor units and secondary fan motor units.

56. A system controller as in claim 40, wherein
said fan motor units comprise primary exhaust and supply fan motor units and secondary fan motor units.

* * * * *